United States Patent
Takano

(10) Patent No.: US 10,897,296 B2
(45) Date of Patent: Jan. 19, 2021

(54) TERMINAL APPARATUS, BASE STATION, METHOD AND RECORDING MEDIUM

(71) Applicant: Sony Corporation, Tokyo (JP)

(72) Inventor: Hiroaki Takano, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/313,263

(22) PCT Filed: Jun. 16, 2017

(86) PCT No.: PCT/JP2017/022400
§ 371 (c)(1),
(2) Date: Dec. 26, 2018

(87) PCT Pub. No.: WO2018/020900
PCT Pub. Date: Feb. 1, 2018

(65) Prior Publication Data
US 2019/0158166 A1    May 23, 2019

(30) Foreign Application Priority Data

Jul. 29, 2016 (JP) .................. 2016-150170

(51) Int. Cl.
*H04W 48/16* (2009.01)
*H04B 7/06* (2006.01)
(Continued)

(52) U.S. Cl.
CPC ............ *H04B 7/0617* (2013.01); *H04B 7/06* (2013.01); *H04B 7/063* (2013.01); *H04B 7/0695* (2013.01);
(Continued)

(58) Field of Classification Search
CPC ........ H04B 7/0617; H04B 7/063; H04B 7/06; H04B 7/0695; H04B 7/088; H04B 17/309;
(Continued)

(56) References Cited

U.S. PATENT DOCUMENTS

| 2014/0073329 A1* | 3/2014 | Kang ................... H04W 36/30 |
| | | 455/439 |
| 2016/0044551 A1 | 2/2016 | Frenger et al. |

(Continued)

FOREIGN PATENT DOCUMENTS

| EP | 2 928 234 A1 | 10/2015 |
| JP | 2006-211366 A | 8/2006 |

(Continued)

OTHER PUBLICATIONS

English translation of International Search Report and Written Opinion for International Application No. PCT/JP2017/022400, dated Jul. 11, 2017.

(Continued)

*Primary Examiner* — Vinncelas Louis
(74) *Attorney, Agent, or Firm* — Xsensus LLP

(57) ABSTRACT

[Object] To provide a mechanism capable of evaluating the quality of beams in an environment in which beam tracking is provided.
[Solution] A terminal apparatus, including: a communication unit configured to perform communication with a base station configured to form beams and perform communication; and a control unit configured to receive a downlink signal transmitted from the base station using the beams and thereby acquire quality information indicating quality related to a direction of the beams used for transmitting the downlink signal.

21 Claims, 17 Drawing Sheets

(51) Int. Cl.
*H04W 16/28* (2009.01)
*H04W 24/10* (2009.01)
*H04W 76/25* (2018.01)
*H04B 7/08* (2006.01)
*H04W 36/00* (2009.01)
*H04B 17/309* (2015.01)
*H04W 48/20* (2009.01)
*H04W 72/04* (2009.01)

(52) U.S. Cl.
CPC ........... *H04B 7/088* (2013.01); *H04B 17/309* (2015.01); *H04W 16/28* (2013.01); *H04W 24/10* (2013.01); *H04W 36/0058* (2018.08); *H04W 48/16* (2013.01); *H04W 76/25* (2018.02); *H04W 48/20* (2013.01); *H04W 72/042* (2013.01)

(58) Field of Classification Search
CPC . H04B 7/0632; H04B 7/086; H04W 36/0058; H04W 76/25; H04W 48/16; H04W 24/10; H04W 16/28; H04W 48/20; H04W 36/30; H04W 74/0833
See application file for complete search history.

(56) References Cited

U.S. PATENT DOCUMENTS

2017/0195998 A1* 7/2017 Zhang .................... H04B 7/086
2017/0302355 A1* 10/2017 Islam ................ H04W 74/0833
2018/0262958 A1* 9/2018 Melin ................. H04W 52/365

FOREIGN PATENT DOCUMENTS

JP      2015-164281 A    9/2015
WO     2016/013351 A1    1/2016

OTHER PUBLICATIONS

Extended European Search Report dated Jun. 25, 2019 in European Application No. 17833910.7.

* cited by examiner

TERMINAL APPARATUS, BASE STATION, METHOD AND RECORDING MEDIUM

CROSS-REFERENCE TO RELATED APPLICATIONS

This application is a National Stage Application based on PCT/JP2017/022400, filed on 16 Jun. 2017, and claims priority to Japanese Patent Application No. 2016-150170, filed on 29 Jul. 2016, the entire contents of which being incorporated herein by reference.

TECHNICAL FIELD

The present disclosure relates to a terminal apparatus, a base station, a method and a recording medium.

BACKGROUND ART

In recent years, 5G which is a next generation communication standard has been discussed in the Third Generation Partnership Project (3GPP). Communication technology constituting 5G is also called New Radio Access Technology (NR).

One of the study items of 3GPP Release 14 is multiple-input and multiple-output (MIMO) for NR. MIMO is a technique for performing beam forming using a plurality of antennas, and includes 3D (or full dimension)-MIMO capable of performing beam forming in three-dimensional directions, massive-MIMO using a plurality of antennas, and the like. Improvement in the accuracy of a beam tracking technique for continuously providing appropriate beams to a user terminal is required in MIMO.

For example, a technique for deciding beams for a user apparatus on the basis of feedback information from a user apparatus for beam forming is disclosed in the following Patent Literature 1.

PATENT LITERATURE

Patent Literature 1: JP 2015-164281A

DISCLOSURE OF INVENTION

Technical Problem

However, techniques related to beam tracking such as that proposed in Patent Literature are still under discussion, and it is difficult to say that sufficient proposals have been made. For example, a technique for evaluating the quality of beams in an environment in which beam tracking is provided is also a technique that has not been sufficiently proposed.

Solution to Problem

According to the present disclosure, there is provided a terminal apparatus, including: a communication unit configured to perform communication with a base station configured to form beams and perform communication; and a control unit configured to receive a downlink signal transmitted from the base station using the beams and thereby acquire quality information indicating quality related to a direction of the beams used for transmitting the downlink signal.

In addition, according to the present disclosure, there is provided a base station, including: a communication unit configured to form beams and perform communication with a terminal apparatus; and a control unit configured to notify the terminal apparatus of setting information for causing the terminal apparatus to acquire quality information indicating quality related to a direction of the beams and the quality information.

In addition, according to the present disclosure, there is provided a method, including: performing communication with a base station configured to form beams and perform communication; and receiving, by a processor, a downlink signal transmitted from the base station using the beams and thereby acquiring quality information indicating quality related to a direction of the beams used for transmitting the downlink signal.

In addition, according to the present disclosure, there is provided a method, including: forming beams and performing communication with a terminal apparatus; and notifying, by a processor, the terminal apparatus of setting information for causing the terminal apparatus to acquire quality information indicating quality related to a direction of the beams and the quality information.

In addition, according to the present disclosure, there is provided a recording medium having a program recorded thereon, the program causing a computer to function as: a communication unit configured to perform communication with a base station configured to form beams and perform communication; and a control unit configured to receive a downlink signal transmitted from the base station using the beams and thereby acquire quality information indicating quality related to a direction of the beams used for transmitting the downlink signal.

In addition, according to the present disclosure, there is provided a recording medium having a program recorded thereon, the program causing a computer to function as: a communication unit configured to form beams and perform communication with a terminal apparatus; and a control unit configured to notify the terminal apparatus of setting information for causing the terminal apparatus to acquire quality information indicating quality related to a direction of the beams and the quality information.

Advantageous Effects of Invention

As described above, according to the present disclosure, a mechanism capable of evaluating the quality of beams in an environment in which beam tracking is provided is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
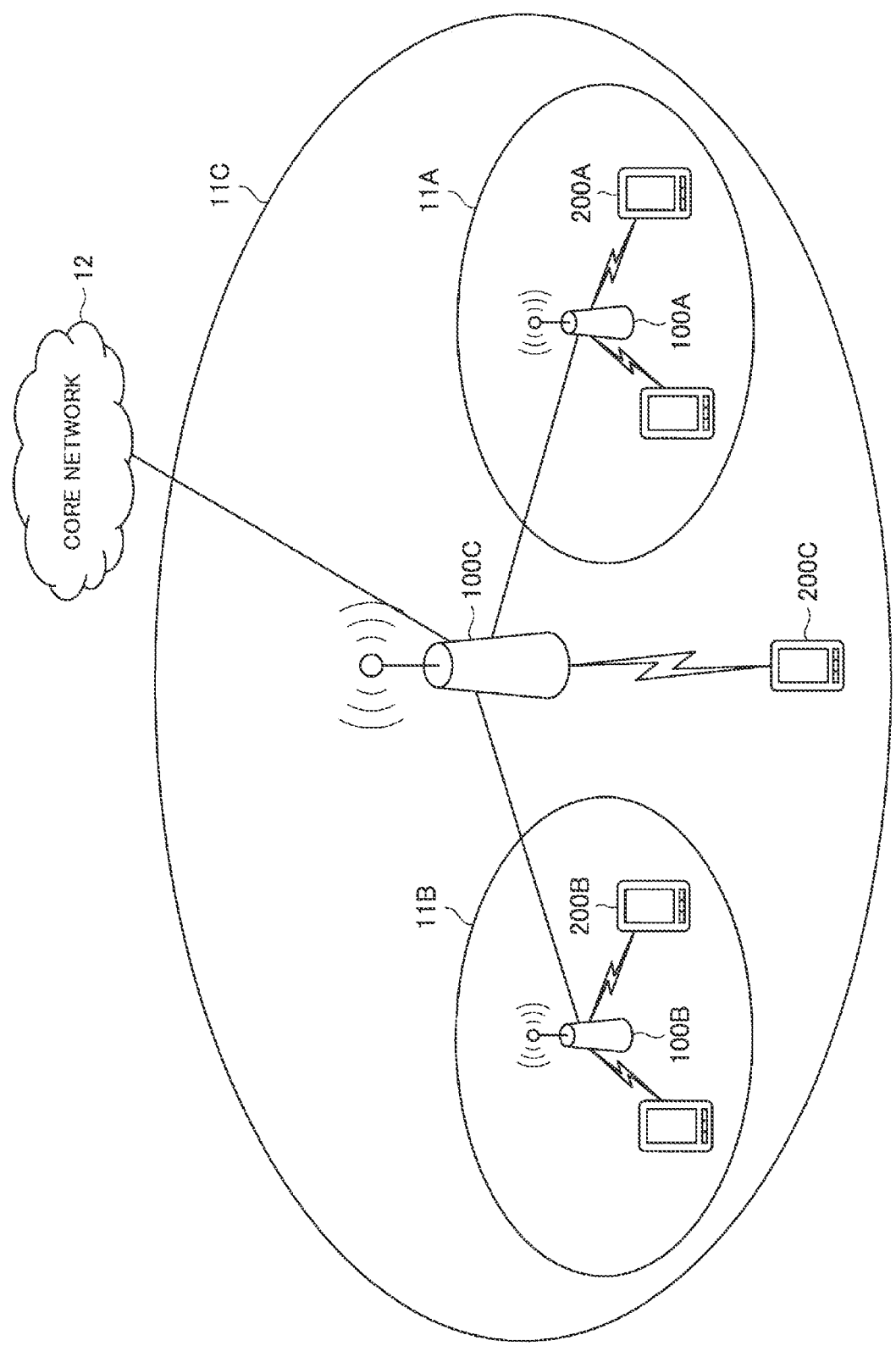
FIG. 1 is a diagram for describing an example of a configuration of a system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same sign. For example, multiple elements having substantially the same function and structure are distinguished as base stations 100A, 100B, and 100C as appropriate. On the other hand, when not particularly distinguishing each of multiple elements having substantially the same function and structure, only the same sign will be given. For example, the base stations 100A, 100B, and 100C will be simply designated the base stations 100 when not being particularly distinguished.

Further, the description will proceed in the following order.

1. System configuration example
2. Considerations related to beam tracking
2.1. Overview of beam tracking
2.2. SRS
2.3. Other
3. Configuration example of each apparatus
3.1. Configuration example of base station
3.2. Configuration of terminal apparatus
4. First embodiment
4.1. Technical problems
4.2. Technical features
5. Second embodiment
5.1. Technical problems
5.2. Technical features
6. Application examples
7. Conclusion 1.1. System Configuration Example First, an example of a configuration of a system according to an embodiment of the present disclosure will be described with reference to FIG. 1. FIG. 1 is a diagram for describing an example of a configuration of a system according to the present embodiment. As illustrated in FIG. 1, a system 1 according to the present embodiment includes a base station 100, and a terminal apparatus 200.

The base station 100 is an apparatus which operates a cell 11 and provides radio communication service to the terminal apparatus 200 in the cell 11. As illustrated in FIG. 1, there may be a plurality of base stations 100, and the base stations 100A to 100C operate cells 11A to 11C, respectively, and provide radio communication services to the terminal apparatuses 200A to 200C, respectively. In the example illustrated in FIG. 1, the base stations 100A and 100B are small cell base stations, and the cells 11A and 11B are small cells. Further, the base station 100C is a macro cell base station, and the cell 11C is a macro cell. The macro cell base station 100C has a function of cooperatively controlling radio communication performed by the small cell base stations 100A and 100B subordinate thereto. Further, the base stations 100 are connected to be capable of communicating with each other and are connected via, for example, an X2 interface. Further, the base station 100 and a core network 12 are connected to be capable of communicating with each other and are connected via, for example, an S1 interface.

The terminal apparatus 200 is an apparatus communicating with the base station 100. Typically, the terminal apparatus 200 has high mobility and performs cell selection according to its movement. In addition, in a case in which beams are formed by the base station 100 or the terminal apparatus 200, beam tracking for forming appropriate beams according to the movement of the terminal apparatus 200 and performing communication is performed.

Hereinafter, the base station is also referred to as an evolved Node B (eNB). The base station 100 is not limited to a base station which is operated according to radio access technology in LTE and may be operated in accordance with radio access technology of 5G. In other words, the base station may be called by a name other than "eNB." Similarly, hereinafter, the terminal apparatus is also referred to as a user equipment (UE) or a user, but the terminal apparatus 200 is not limited to a terminal apparatus which is operated in accordance with radio access technology in LTE and may be operated in accordance with radio access technology of 5G.

A core network 12 includes a control node configured to control the base station 100. The core network 12 may include, for example, an evolved packet core (EPC) or a 5G architecture. The core network 12 is connected to a packet data network through a gateway device.

2. Considerations Related to Beam Tracking

Considerations related to beam tracking will be discussed below from different viewpoints
<2.1. Overview of Beam Tracking>
(Necessity of Beam Tracking)

It is assumed that an extremely large number of antennas (more specifically, antenna elements) such as, for example, 256 antennas in a 30 GHz band and 1,000 antennas in a 70 GHZ band are installed in an eNB. It is possible to form sharper beams as the number of antenna elements increases. For example, it is possible to provide, for example, very sharp beams in which a half-value width (indicating a minimum degree at which a level of 3 dB drop occurs) is 1° or less from the eNB to the UE.

It is assumed that, in an environment in which very sharp beams are formed, the UE can easily leave the beams in a case in which the UE moves at a high speed (for example, the UE moves at 500 km/h). If the UE leaves the beams, it is difficult to transmit data from the eNB to the UE. Therefore, it is desirable that the beams be formed to be able to track the UE moving at a high speed as illustrated in FIG. 2.

Figure 2:
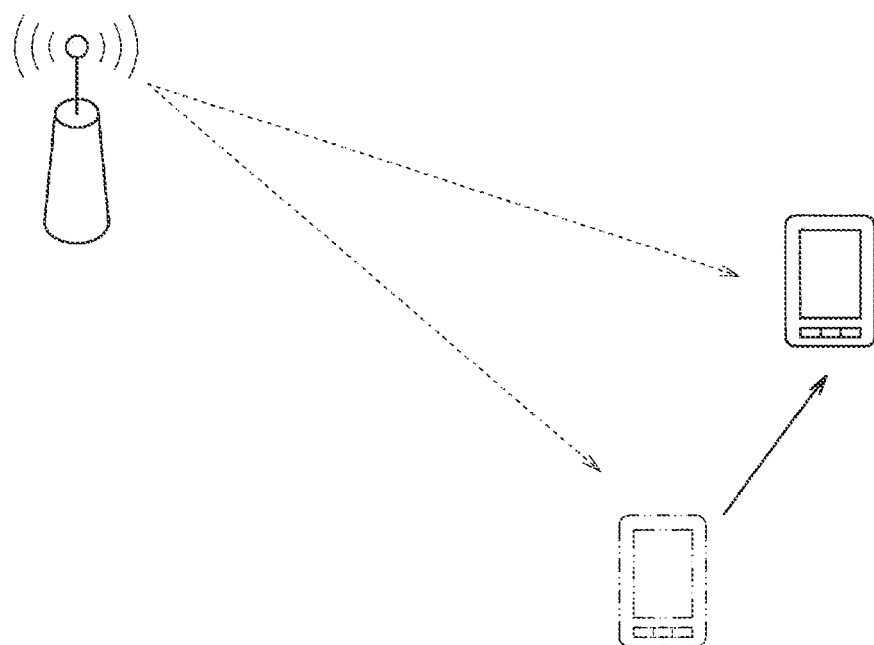
FIG. 2 is a diagram for describing considerations related to beam tracking.

FIG. 2 is a diagram for describing considerations related to beam tracking. As illustrated in FIG. 2, it is desirable to cause beams formed by the eNB to track the movement of the UE.
(Codebook-Based Beam Forming)

In LTE, it is unlikely for a mechanism that causes beams to be changed steplessly and rebuilds beams tracking a UE to be employed. This is because a calculation cost for rebuilding new beams occurs. In this regard, a mechanism for forming beams facing in as many directions as possible in advance from an eNB, selecting beams to be used for communication with a UE among the beams formed in advance, and providing the selected beams is employed in full dimension multi-input multi-output (FD-MIMO) of 3GPP Release 13. Such a mechanism is also referred to as codebook-based beam forming.

For example, in a case in which beams of 1° are prepared for 360° in a horizontal direction, 360 beams are prepared. In a case in which beams overlap by half, 720 beams are prepared. In a case in which beams is prepared similarly for −90° to +90° in a vertical direction, 360 beams corresponding to 180° are prepared.

In the codebook-based beam forming, beam tracking means continuously selecting beams suitable for communication with a UE among beams prepared in advance as a code book.
(Beam Tracking Based on Downlink Reference Signal)

In 3GPP RAN1 Release 13 FD-MIMO, beam selection was investigated. In this investigation, selection of beams suitable for communication with the UE by the eNB on the basis of a downlink beam-formed reference signal was investigated. Such a downlink reference signal is also referred to as a beam-formed channel state information-reference signal (CSI-RS). The eNB provides a plurality of beam-formed CSI-RSs (multiple beam-formed CSI-RSs) and communicates with the UE using beams corresponding to a reception result in the UE. A beam tracking procedure based on the beam-formed CSI-RS will be described below with reference to FIG. 3.

Figure 3:
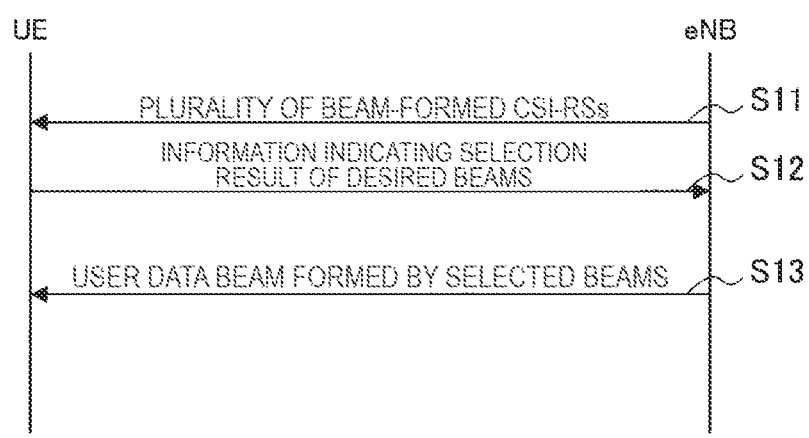
FIG. 3 is a sequence diagram illustrating an example of a flow of a beam tracking procedure based on a beam-formed CSI-RS.

FIG. 3 is a sequence diagram illustrating an example of a beam tracking procedure based on the beam-formed CSI-RS. As illustrated in FIG. 3, first, the eNB transmits a plurality of beam-formed CSI-RSs using a plurality of beams (step S11). Then, the UE selects desired beams among a plurality of beams used for the transmission of the beam-formed CSI-RS on the basis of a reception result of a plurality of provided beam-formed CSI-RSs and transmits information indicating a selection result to the eNB (step S12). The information indicating the selection result includes identification information of desired beams (typically, a beam number). For example, the UE selects one or more desired beams on the basis of the reception power of each beam. Then, the eNB provides user data beam-formed by the selected beams to the UE (step S13).

According to such a procedure, a tracking capability varies depending on a frequency at which a set of a plurality of beam-formed CSI-RSs is provided to the UE. For example, in a case in which a set of a plurality of beam-formed CSI-RSs is provided at intervals of 100 ms, the tracking is performed with a granularity of 100 ms. In a case in which the UE is moving at a speed at which it remains in the beams for 100 ms, the tracking with this granularity is good, but if the speed of the UE increases, for example a case in which tracking with a granularity of 5 ms or less is required occurs. In this case, the overhead of downlink resources for providing a set of a plurality of beam-formed CSI-RSs increases, and thus it is difficult to perform efficient communication.
(Beam Tracking Based on Uplink Reference Signal)

The eNB decides a plurality of beams used to transmit a plurality of beam-formed CSI-RSs described above on the basis of, typically, the uplink reference signal. The eNB detects a rough position of the UE on the basis of the uplink reference signal, selects a plurality of beam candidates suitable for the UE, and transmits a plurality of beam-formed CSI-RSs using a plurality of selected beam candidates. The uplink reference signal is also referred to as a sounding reference signal (SRS). A beam tracking procedure based on the SRS will be described below with reference to FIG. 4.

Figure 4:
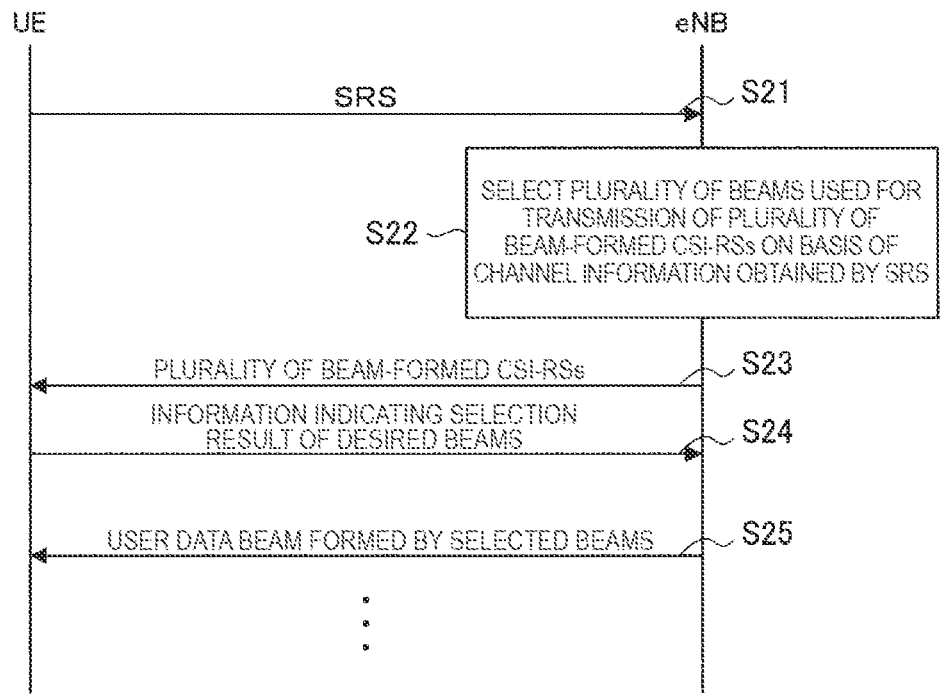
FIG. 4 is a sequence diagram illustrating an example of a flow of a beam tracking procedure based on an SRS.

FIG. 4 is a sequence diagram illustrating an example of a flow of the beam tracking procedure based on the SRS. As illustrated in FIG. 4, the UE first transmits the SRS to the eNB (step S21). Then, the eNB acquires channel information between the UE and the eNB on the basis of a reception result of the SRS, and selects a plurality of beams to be used for transmission of a plurality of beam-formed CSI-RSs on the basis of the channel information (step S22). Thereafter, in steps S23 to S25, a process similar to steps S11 to S13 described above with reference to FIG. 3 is performed.

Here, in the case of time division duplex (TDD), since radio resources are used by uplink and downlink which are switched alternately in terms of time, channel information is similar in downlink and uplink. On the other hand, in the case of frequency division duplex (FDD), since a frequency used for uplink differs from a frequency used for downlink, channel information differs between downlink and uplink. Therefore, in step S21, it can be said that the eNB can acquire (precisely estimate) the downlink channel information on the basis of the SRS only in the case of TDD.

<2.2. SRS>

A main purpose of the SRS is for the eNB to acquire the uplink channel information at a frequency bandwidth (that is, bandwidth) to be operated and use the uplink channel information for downlink scheduling rather than the beam selection described above.

"Scheduling" refers to an operation of the eNB deciding part of downlink or uplink resources (unit resources divided by frequency and time) to be used and notifying the UE of the details of the decision. For example, in a case in which the bandwidth operated by the eNB is 20 MHz, a resource block includes 12 sub carriers arranged at intervals of 15 kHz, and 100 resource blocks are spread in 20 MHz. The resources of the 100 resource blocks are shared by a plurality of UEs. In other words, FDM is performed. Therefore, it can be said that an operation of deciding a part of 20 MHz to be used by the UE is the scheduling of the eNB.

The eNB achieves the main purpose described above on the basis of the SRS. Specifically, the eNB acquires the uplink channel information on the basis of the reception result of the SRS, estimates the downlink channel information on the basis of the acquired channel information, and performs the scheduling on the basis of the estimated downlink channel information.

The existing SRS designed for such a main purpose of scheduling is not considered to be suitable as a reference signal for beam selection. For example, channel information over the entire channel is not necessarily required for beam tracking.

(Format of SRS)

Figure 5:
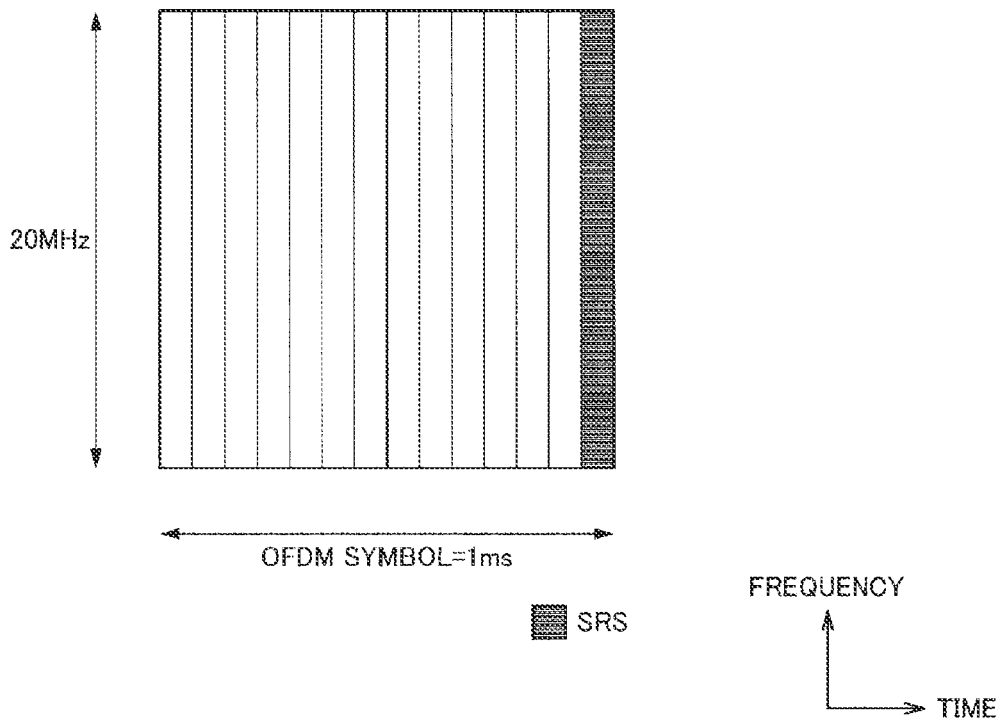
FIG. 5 is a diagram for describing an example of an SRS format in LIE.

FIG. 5 is a diagram for describing an example of a format of the SRS in LTE. The uplink of LTE is operated in accordance with single carrier frequency division multiple access (SC-FDMA), and includes 14 symbols per sub frame. A symbol in the time direction in the uplink is also referred to as an SC-FDMA symbol or an OFDM symbol. As illustrated in FIG. 5, the SRS is transmitted using the last OFDM symbol. Here, the SRS is not necessarily transmitted using the last OFDM symbol in all sub frames. For example, normally, a physical uplink shared channel (PUSCH) serving as user data and a physical uplink control channel (PUCCH) serving as a control signal are transmitted using all 14 OFDM symbols. Further, the SRS is transmitted using the last OFDM symbol only if necessary.

(Narrow Band SRS and Wide Band SRS)

There are cases in which the SRS occupies the entire operated bandwidth and is transmitted all at once as illustrated in FIG. 5. On the other hand, a part of the operated bandwidth may be used for single transmission of the SRS once. The former is also referred to as a wide band SRS, and the latter is also referred to as a narrow band SRS.

Figure 6:
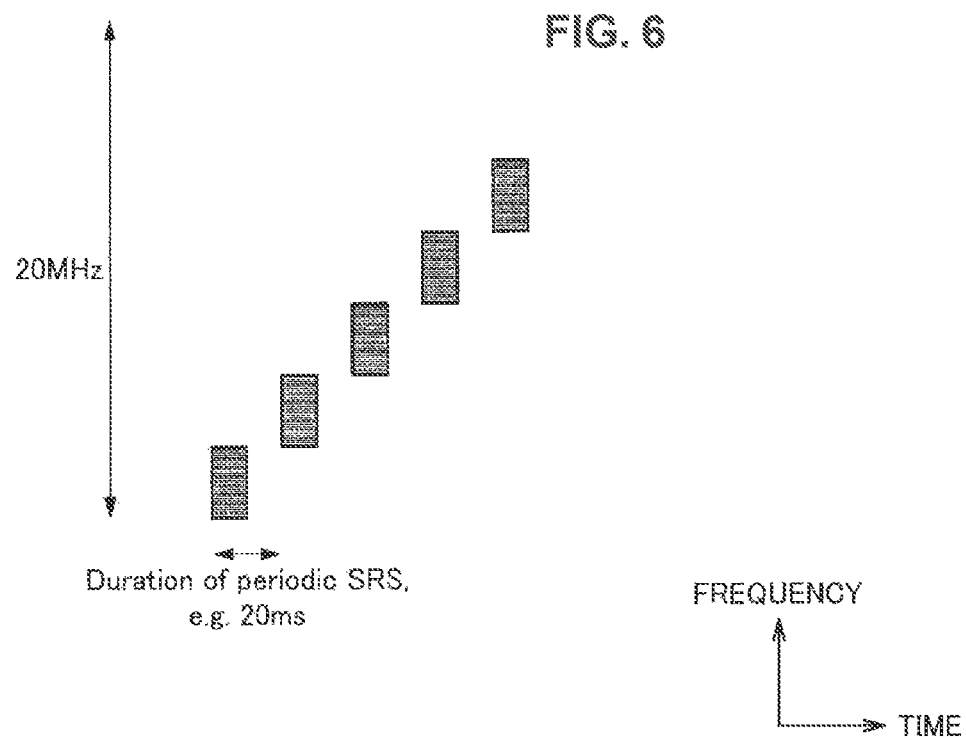
FIG. 6 is a diagram for describing an SRS of a narrow band in LTE.

FIG. 6 is a diagram for describing the narrow band SRS in LTE. As illustrated in FIG. 6, the narrow band SRS uses a part of the bandwidth in a single transmission. Here, in order to achieve the main purpose of detecting the channel state of the entire bandwidth to be operated, even in the narrow band SRS, the bandwidth used for transmission is shifted, and the SRS is transmitted over the entire operated bandwidth accordingly as illustrated in FIG. 6. A merit of the narrow band SRS lies in that it is possible to cause the uplink coverage of the SRS to be increased since the UE can use more power for a single transmission of the SRS. In other words, the merit of the narrow band SRS lies in that the quality of the SRS received by the eNB can be improved.

It should be noted here that both of the wide band SRS and the narrow band SRS are designed to be mainly intended to acquire the channel information of the entire operated bandwidth. In other words, a target bandwidth of both of the wide band SRS and the narrow band SRS is the entire bandwidth operated by the eNB.

(Periodic SRS and Aperiodic SRS)

The eNB can perform a setting in the UE so that the SRS is transmitted periodically or aperiodically.

In a case in which the periodic SRS is set, the eNB performs the setting using radio resource control (RRC) signaling in a semi-static manner. Thus, it is difficult to dynamically change, for example, the transmission period for the periodic transmission.

On the other hand, in the case of the aperiodic SRS, the eNB transmits an SRS request aperiodically according to necessity, and the UE transmits the SRS in a case in which the SRS request is received. Here, the aperiodic SRS is not considered suitable as a reference signal for periodically selecting beams for beam tracking. This is because the downlink SRS request becomes overhead.

(Relation Between SRS and Beams Selection)

In a case in which the eNB provides beams to the UE, it is desirable to select beams suitable for the UE.

As a method for this purpose, it is considered that the eNB provides a plurality of beam-formed reference signals, and performs communication with the UE using the beams corresponding to the reception result in the UE as described above with reference to FIGS. 3 and 4. In this case, as described above with reference to FIG. 4, the eNB may decide a plurality of beams to be used for transmitting a plurality of beam-formed reference signals on the basis of the SRS. This is because the eNB can detect a direction of the UE roughly on the basis of the reception result of the SRS.

As described above, the SRS can be used for selecting the beams to be provided to the UE. On the other hand, since the SRS is the uplink reference signal, it is difficult for the eNB to detect a downlink interference situation on the basis of the reception result of the SRS. Therefore, it is desirable that the UE decide the final beams selection on the basis of the downlink reference signal.

Figure 7:
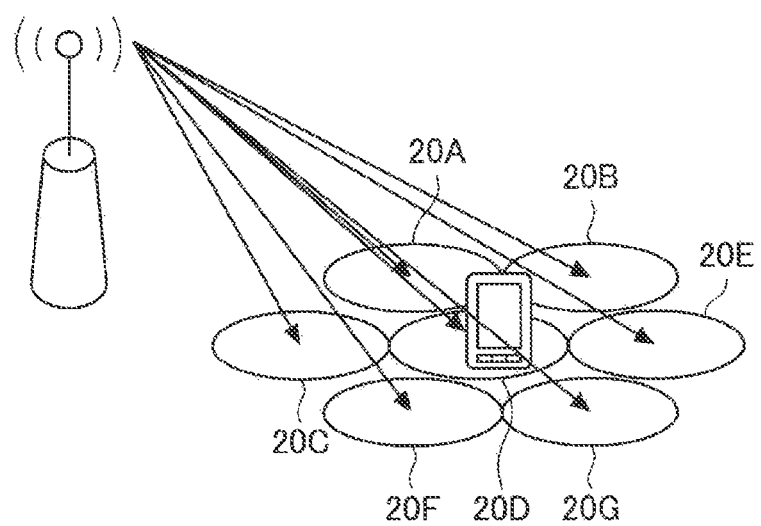
FIG. 7 is a diagram for describing beam selection using an SRS and a beam-formed CSI-RS.
Figure 8:
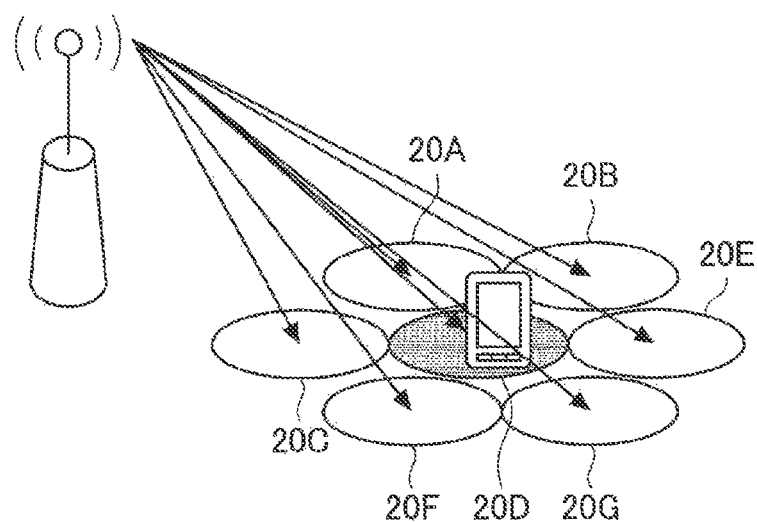
FIG. 8 is a diagram for describing beam selection using an SRS and a beam-formed CSI-RS.

The beam selection using the SRS and the beam-formed downlink reference signal described above will be described in detail with reference to FIGS. 7 and 8. FIGS. 7 and 8 are diagrams for describing the beam selection using the SRS and the beam-formed CSI-RS.

As described above with reference to FIG. 4, the eNB detects the rough position of the UE on the basis of the SRS and selects a plurality of beam candidates suitable for the UE. Then, the eNB transmits a plurality of beam-formed CSI-RSs using the plurality of selected beam candidates as illustrated in FIG. 7. In the example illustrated in FIG. 7, a plurality of beam-formed CSI-RSs are transmitted to areas 20A to 20G, and the UE is located in the area 20D at the center. In other words, a plurality of beam-formed CSI-RSs roughly detect the UE.

Thereafter, the UE selects one or more desired beams among a plurality of beams used for transmitting the beam-formed CSI-RS on the basis of a reception result of a plurality of provided beam-formed CSI-RSs, and transmits information indicating a selection result to the eNB. For example, in the example illustrated in FIG. 8, the UE selects beams directed toward the area 20D. Then, the eNB selects beams suitable for the UE on the basis of the information indicating the beam selection result. For example, in the example illustrated in FIG. 8, the eNB selects beams directed toward the area 20D on the basis of the feedback from the UE.

<2.3. Others>
(1) Difficulty of Beam Tracking

The difficulty of beam tracking will be discussed below.

First, it is assumed that the UE is stationary without moving at all. In this case, the beams selection for beam tracking is easy because there are many cases in which the beams suitable for the UE are not changed. Here, even in a case in which the UE is stationary, the beams selection may be performed again due to influence of beam blocking (hereinafter also referred to as blocking) occurring, for example, when a surrounding environment, for example, a shielding object such as a car or a person traverses between the eNB and the UE.

Further, a case in which the UE moves at a high speed is assumed. In this case, since it is necessary to cause beams to track the UE moving at the high speed, the difficulty of beam tracking is high. In a case in which the beams provided to the UE are sharp, the difficulty level of beam tracking is higher. For example, in a case in which beams of a 1° width are provided, the difficulty level is higher than that, for example, in a case in which beams of a 10° width are provided. As the beams are sharper, a period of time for the UE to move within a range included in beams is reduced.

In a case in which a discontinuous change in a channel environment occurs irrespective of the moving speed of the UE, the difficulty level of the beam selection is high. The discontinuous change in the channel environment occurs, for example, in a case in which a shielding object suddenly enters between the eNB and the UE, in a case in which the UE with the antennas placed in a plane manner is suddenly rotated, or the like. In this case, the beams suitable for the UE may change. Further, it is considered that there are cases in which beams reaching the UE indirectly are more suitable than beams reaching the LIE directly.

(2) Relationship Between Beam Tracking and Cell Selection

In LTE, the UE receives a downlink reference signal (for example, a CSI-RS) transmitted by the eNB through a non-directional antenna, measures reception power (for example, reference signal received power (RSRP), and selects an eNB of a connection destination on the basis of a measurement result. This measurement is performed even when the UE is already communicating with the eNB, and the UE consistently searches for a more desirable eNB.

For example, there are cases in which downlink quality (that is, a reception power measurement result of the downlink reference signal) provided from an eNB in the connected state (that is, a serving eNB) is unacceptable, and there is another eNB with better downlink quality. In this case, the UE decides to perform the handover to the other eNB (that is, a target eNB) and notifies the serving eNB of that desire. Then, a handover decision of whether or not the handover permitted is performed by the serving eNB, and in a case in which the handover is permitted, the UE performs the handover to the target eNB.

In a case in which the eNB can provide sharp beams, the eNB can perform beam selection (that is, beam tracking) to cause the beams to back the movement of the UE. However, in a case in which beams are always tracking, it is difficult for the UE to decide a timing to perform the handover to another eNB. This is because, in a case in which the serving eNB causes sharp beams with directivity to track the movement of the UE, the serving eNB can provide excellent downlink quality even at a cell edge.

For this reason, it is difficult for the UE to decide the handover timing in the environment in which beam tracking is performed.

3. Configuration Example of Each Apparatus

Next, an example of a configuration of each apparatus included in a system 1 according to one embodiment of the present disclosure will be described.

<3.1. Configuration Example of Base Station>

Figure 9:
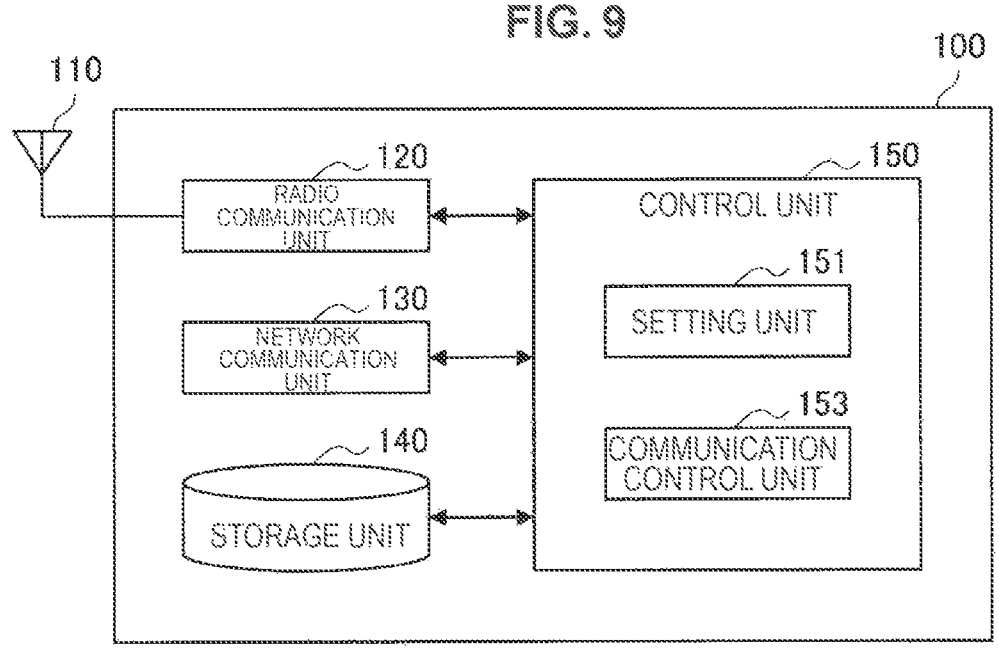
FIG. 9 is a block diagram illustrating an example of a configuration of a base station according to the present embodiment.

FIG. 9 is a block diagram illustrating an example of a configuration of the macro cell base station 100 according to the present embodiment. As illustrated in FIG. 9, the macro cell base station 100 includes an antenna unit 110, the radio communication unit 120, a network communication unit 130, a storage unit 140 and a control unit 150.

(1) Antenna Unit 110

The antenna unit 110 emits a signal to be output by the radio communication unit 120 into space as radio waves. In addition, the antenna unit 110 converts spatial radio waves into a signal and outputs the signal to the radio communication unit 120.

In particular in the present embodiment, the antenna unit 110 includes a plurality of antenna elements and is capable of performing beam forming.

(2) Radio Communication Unit 120

The radio communication unit 120 transmits and receives signals. For example, the radio communication unit 120 transmits a downlink signal to the terminal apparatus and receives an uplink signal from the terminal apparatus.

In particular, in the present embodiment, the radio communication unit 120 can form a plurality of beams through the antenna unit 110 and communicate with the terminal apparatus 200.

(3) Network Communication Unit 130

The network communication unit 130 transmits and receives information. For example, the network communication unit 130 transmits information to another node and receives information from the other node. For example, the other node includes another base station and a core network node.

(4) Storage Unit 140

The storage unit 140 temporarily or permanently stores a program and various data for an operation of the base station 100.

(5) Control Unit 150

The control unit 150 provides various functions of the base station 100. The control unit 150 includes a setting unit 151 and a communication control unit 153. Further, the control unit 150 may further include other components than these components. In other words, the control unit 150 may also perform operations other than those of these components. The operations of the setting unit 151 and the communication control unit 153 will be described later in detail.

<3.2. Configuration of Terminal Apparatus>

Figure 10:
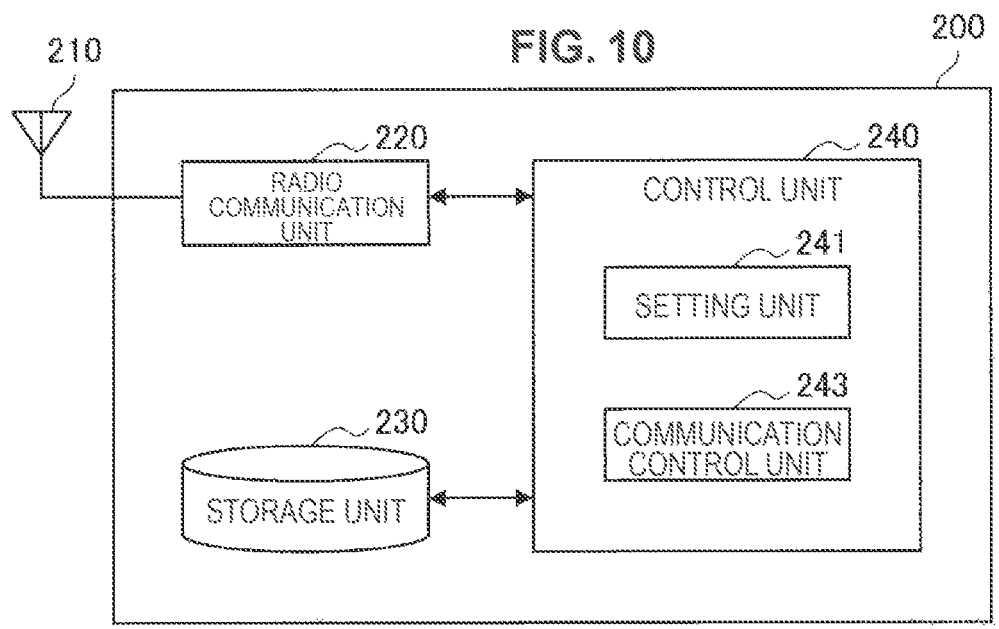
FIG. 10 is a block diagram illustrating an example of a configuration of a terminal apparatus according to the present embodiment.

FIG. 10 is a block diagram illustrating an example of a configuration of the terminal apparatus 200 according to the present embodiment. As illustrated in FIG. 10, the terminal apparatus 200 includes an antenna unit 210, a radio communication unit 220, a storage unit 230 and a control unit 240.

(1) Antenna Unit 210

The antenna unit 210 emits a signal to be output by the radio communication unit 220 into space as radio waves. In addition, the antenna unit 210 converts spatial radio waves into a signal and outputs the signal to the radio communication unit 220.

(2) Radio Communication Unit 220

The radio communication unit 220 transmits and receives signals. For example, the radio communication unit 220 receives a downlink signal from the base station and transmits an uplink signal to the base station.

In particular, in the present embodiment, the radio communication unit 220 can communicate with the base station 100 that forms a plurality of beams and perform communication.

(3) Storage Unit 230

The storage unit 230 temporarily or permanently stores a program and various data for an operation of the terminal apparatus 200.

(4) Control Unit 240

The control unit 240 provides various functions of the terminal apparatus 200. The control unit 240 includes a setting unit 241 and a communication control unit 243. Further, the control unit 240 may further include other components than these components. In other words, the control unit 240 may also perform operations other than the operations of these components. The operations of the setting unit 241 and the communication control unit 243 will be described later in detail.

Hereinafter, the base station 100 is also referred to as an eNB 100, and the terminal apparatus 200 is also referred to as a UE 200.

4. First Embodiment

The present embodiment is a mode in which a notification indicating quality information of beams used for transmitting the beam-formed downlink signal from the eNB 100 is given to the UE 200, and a process based on the quality information is performed.

<4.1. Technical Problem>

A technical problem of the present embodiment lies in that it is difficult to decide the handover timing in the environment in which beam tracking is performed as described above.

<4.2. Technical Features>

(1) BQI

In light of the technical problem, in the present embodiment, quality information indicating quality related to a direction of beams used by the eNB 100 is introduced. The quality information can be expressed by an arbitrary method. For example, the quality information may be expressed as an indicator of whether the quality is good or bad. In the following example, a beam quality index (BQI) is introduced as an example of the quality information expressed as an index indicating whether the quality is good or bad. For example, the BQI can be used for handover decision. For example, the UE 200 may not perform the handover in a case in which the BQI is good and may perform the handover in a case in which the BQI is bad.

The eNB 100 (for example, the setting unit 151) may set the BQI in accordance with an arbitrary criterion.

For example, the BQI may be set in accordance with a degree to which beams face the cell edge. For example, a bad BQI may be set for beams which face the cell edge to a high degree. Further, a good BQI may be set for beams which face the cell edge to a low degree, that is, beams which face the cell center to a high degree. Accordingly, it is possible to urge the UE 200 receiving the beams facing the cell edge, that is, the UE 200 located at the cell edge, to perform the handover or the cell selection to an appropriate eNB 100.

Further, the BQI may be set in accordance with an angle formed by a direction of the beams and a reference direction. The reference direction is a horizontal direction or a vertical direction, and for example, in a case in which a horizontal direction is used as a reference, the BQI may be set in accordance with an angle formed by the direction of the beams and the horizontal direction (that is, the angle in the vertical direction). This is because the angle of the beams in the vertical direction typically corresponds to the degree to which beams faces the cell edge. For example, it is assumed that an angle in the horizontal direction is 0°, an angle in the vertical direction (that is, the direction of the ground) is −90°, and an angle in a zenith direction which is a direction opposite to the vertical direction is 90°. In this case, the bad BQI may be set for beams whose angle is 0° or close to 0°, and the good beams may be set for beams whose angle is −90° or close to −90° or beams whose angle is 90° or close to 90°. With this setting, it is possible to urge the UE 200 located at a position at which the UE 200 is likely to give interference to an adjacent cell or receive interference from an adjacent cell to perform the handover or the cell selection to a more appropriate eNB 100. Further, it is possible to suppress the interference with the adjacent cell and the interference from the adjacent cell accordingly.

Figure 11:
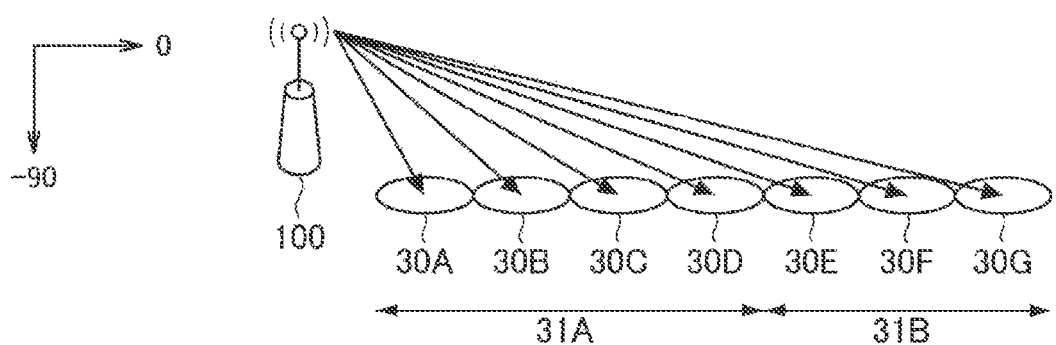
FIG. 11 is a diagram for describing an example of a BQI according to a first embodiment.
Figure 12:
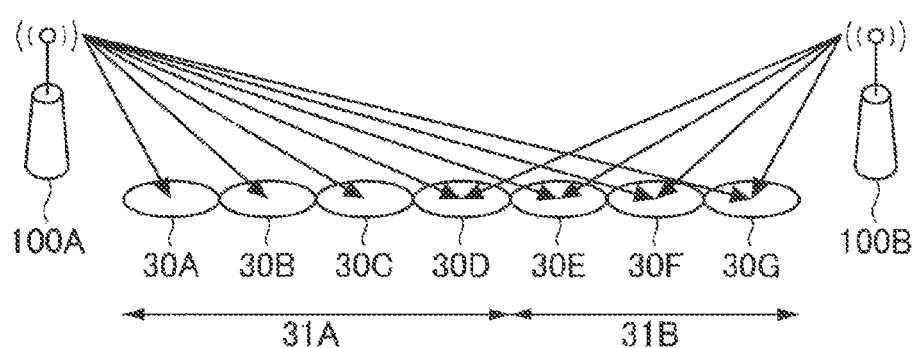
FIG. 12 is a diagram for describing an example of a BQI according to the present embodiment.

First, the case in which the angle of beams in the vertical direction is between −90° and 0° will be described in detail with reference to FIG. 11 and FIG. 12. FIG. 11 and FIG. 12 are diagrams for describing an example of the BQI according to the present embodiment.

A situation in which the eNB 100 can transmit the downlink signal using a plurality of beams as illustrated in FIG. 11 is assumed. In the example illustrated in FIG. 11, the eNB 100 may transmit the beam-formed downlink signal using beams directed toward areas 30A to 30G. Generally, the eNB 100 is located at a height of about 10 meters (m) from the ground, and the UE 200 is located at a height of about 1 to 2 m from the ground. Therefore, as the angle of beams in the vertical direction is closer to −90°, the influence in the horizontal direction is less (that is, it is difficult for beams to reach a position far from the cell center), and thus it is difficult to give interference to the adjacent eNB and to receive interference from the adjacent eNB. In this regard, the eNB 100 sets a good BQI for beams transmitted to a range 31A close to the vertical direction, that is, beams whose angle in the vertical direction is close to −90°.

On the other hand, as the angle of beams in the vertical direction is closer to 0°, the influence in the horizontal direction is greater (that is, it is easy for beams to reach a position far from the cell center), and thus it is easy to give interference to the adjacent eNB and receive interference from the adjacent eNB. For example, there are cases in which an eNB 100B which is the adjacent eNB may be more suitable for providing beams in a range 31B than an eNB 100A (corresponding to the eNB 100 in FIG. 11) as illustrated in FIG. 12. In this regard, the eNB 100A sets the bad BQI for beams transmitted toward the range 31B close to the horizontal direction, that is, beams whose angle in the vertical direction close to 0°.

With this setting, it is possible to urge the UE 200 located at a position at which the UE 200 is likely to give interference to an adjacent cell or receive interference from an adjacent cell to perform the handover or the cell selection to a more appropriate eNB 100. Further, it is possible to suppress the interference with the adjacent cell and the interference from the adjacent cell accordingly.

Figure 13:
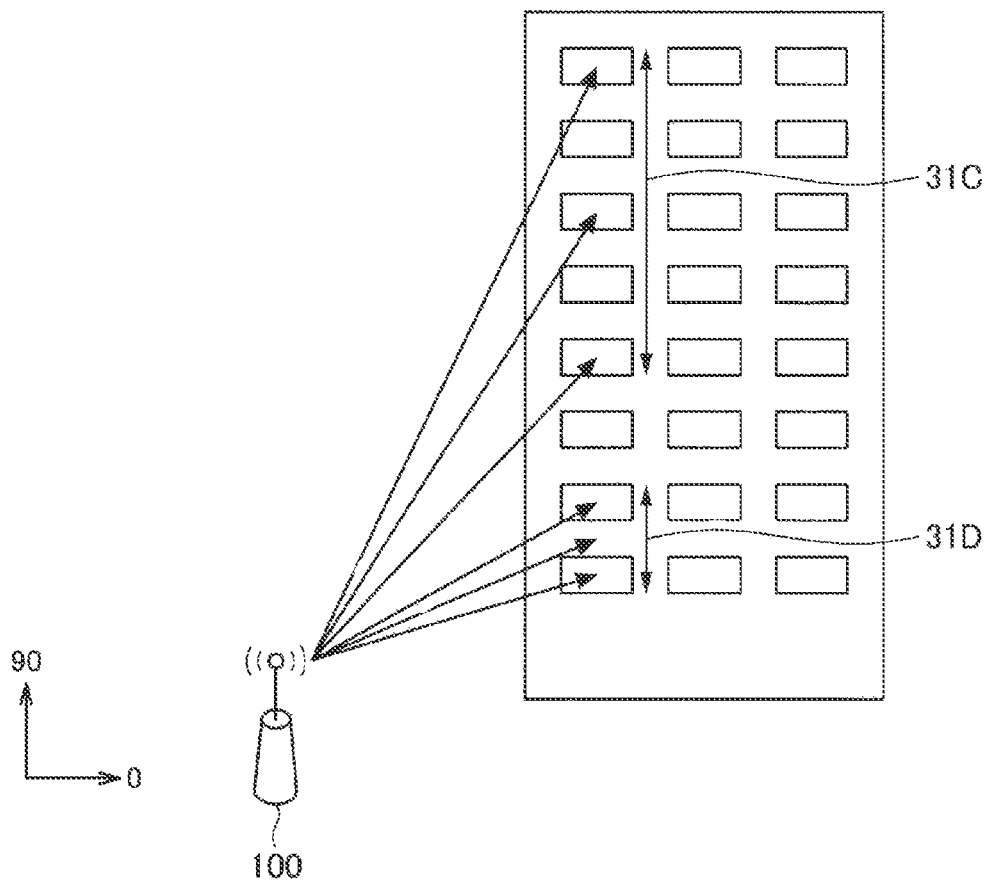
FIG. 13 is a diagram for describing an example of a BQI according to the present embodiment.

Next, a case in which the angle of beams in the vertical direction is 90° to 0° will be described in detail with reference to FIG. 13. FIG. 13 is a diagram for describing an example of the BQI according to the present embodiment.

There are cases in which the UE 200 such as a UE 200 in a building is located at a position higher than the eNB 100 as illustrated in FIG. 13. In this case, the eNB 100 transmits the beam-formed downlink signal to the zenith direction (90°) side rather than the horizontal direction (0°). For example, it is desirable that beams whose angle in vertical direction is close to 90° be provided to the UE 200 located on a high floor.

In this case, similarly to the above example, as the angle of beams in the vertical direction is closer to 90°, the influence in the horizontal direction is less (that is, it is difficult for beams to reach a position far from the cell center), and thus it is difficult to give interference to the adjacent eNB and to receive interference from the adjacent eNB. In this regard, the eNB 100 sets a good BQI for beams transmitted to a range 31c close to the zenith direction, that is, beams whose angle in the vertical direction is close to 90°. On the other hand, as the angle of beams in the vertical direction is closer to 0°, the influence in the horizontal direction is greater (that is, it is easy for beams to reach a position far from the cell center), and thus it is easy to give interference to the adjacent eNB and receive interference from the adjacent eNB. In this regard, the eNB 100 sets a bad BQI for beams transmitted toward a range 31D close to the horizontal direction, that is, beams whose angle in the vertical direction close to 0°.

With this setting, it is possible to urge the UE 200 located at a position at which the UE 200 is likely to give interference to an adjacent cell or receive interference from an adjacent cell to perform the handover or the cell selection to a more appropriate eNB 100. Then, it is possible to suppress the interference to the adjacent cell and the interference from the adjacent cell.

An example of the set values of the BQI described above is shown in the following Table 1.

TABLE 1

| BQI (3 bits) | Meaning of BQI | Angle of beams from eNB |
|---|---|---|
| 0 | Good | Angle close to vertical direction (−90°~) |
| 1 | Normal | Intermediate angle between vertical direction and horizontal direction |
| 2 | Bad | Angle close to vertical direction (~0°) |
| 3 | Good | Angle close to zenith direction (~90°) |
| 4 | Normal | Intermediate angle between zenith direction and horizontal direction |
| 5 | Bad | Angle close to horizontal direction (0°~) |

Further, the fact that the BQI is set in accordance with the angle formed by the direction of the beams and the horizontal direction (that is, the angle in the vertical direction) means that the BQI is set in accordance with the angle formed by the direction of the beams and the vertical direction. In this case, −90° may be replaced with 0°, 0° may be replaced with 90°, and 90° may be replaced with 180°.

In addition to the BQI, the quality information of beams can be expressed in various formats such as information indicating the angle formed by the direction of the beams and the horizontal direction, information indicating the degree of beams facing the cell edge, and the like. However the degree of freedom of expression is considered to be higher in a case in which the quality information is indicated by the BQI. Hereinafter, the quality information is also referred to simply as a BQI, but the quality information of the present technology is not limited to the BQI.

In addition, the quality information of beams may be understood as information which is simply associated with the direction of beams. Specifically, the quality information of beams may be set on the basis of a positional relation with the adjacent eNB 100. For example, the bad quality information may be set for beams facing in the direction of the adjacent eNB 100, and the good quality information may be set for beams facing in other directions. It is desirable that such dynamic setting be possible if it is considered that small cell ON/OFF can be switched.

(2) BQI Notification Method

The eNB 100 (for example, the communication control unit 153) notifies the UE 200 of the quality information indicating the quality related to the direction of beams. For example, when the downlink signal is transmitted, the eNB 100 notifies of the BQI in association with the downlink signal. Accordingly, the UE 200 can perform a process such as the handover or the cell selection on the basis of the BQI. This point will be described in detail with reference to FIG. 14.

Figure 14:
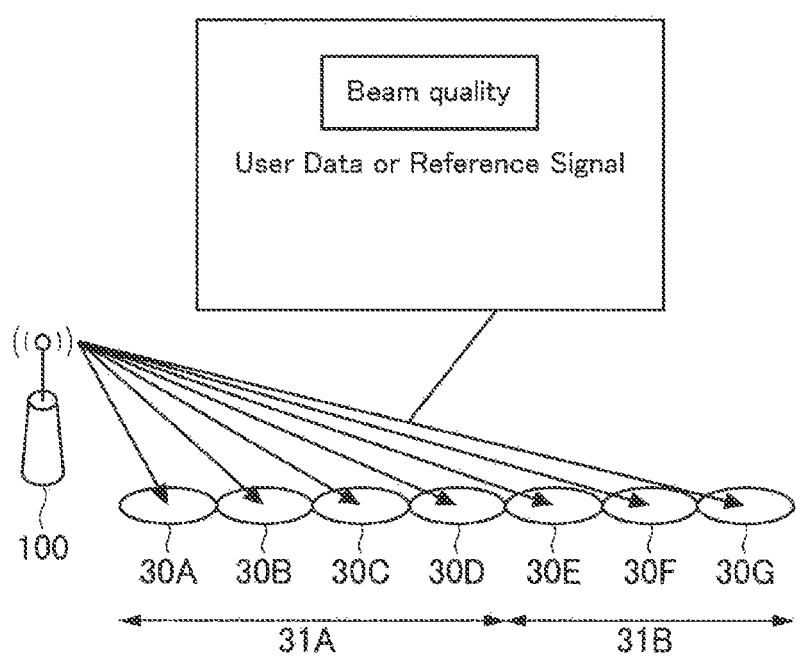
FIG. 14 is a diagram for describing a notification method of a BQI according to the present embodiment.

FIG. 14 is a diagram for describing a BQI notification method according to the present embodiment. In the example illustrated in FIG. 14, the eNB 100 includes the BQI in the downlink signal beam-formed using beams and transmits the resulting downlink signal. As illustrated in FIG. 14, a control region for carrying the quality information of the beams may be prepared in the downlink signal, and the eNB 100 may include the quality information in the control region and notify of the quality information. For example, the eNB 100 includes a good BQI in a control region of a downlink signal beam-formed using beams directed toward the range 31A and transmits the resulting downlink signal. Further the eNB 100 includes a bad BQI in a control region of a downlink signal which is beam-formed using beams directed toward a range 31B and transmits the resulting downlink signal. The downlink signal may be a data signal including user data or a reference signal.

On the other hand, the UE 200 (for example, the communication control unit 243) receives the downlink signal transmitted using the beams from the eNB 100 and thereby acquires the quality information indicating the quality related to the direction of the beams used for transmitting the downlink signal. For example, the UE 200 acquires the BQI of the beams used for transmitting the data signal or the reference signal from the control region of the data signal or the reference signal transmitted from the eNB 100 using the beams.

Here, it is difficult to include the BQI in the reference signal and transmit the resulting reference signal. This is because, typically, in the reference signal transmitted from the eNB for the cell selection, for example, a different code sequence is used between the eNBs so that the UE side can identify the eNB of the transmission source. Therefore, it is possible for the UE to identify the eNB from which the reference signal arrives. On the other hand, since the same reference signal is transmitted from the same eNB even in a case in which different beams are used, it is difficult for the UE to identify each of the reference signals transmitted using different beams arriving from the same eNB for each beam. Here, sequences orthogonal to each other between eNBs are used as the code sequence used as the reference signal. Therefore, it is difficult to include information (for example, the BQI) which is unable to be acquired without decoding in the reference signal.

In this regard, the eNB 100 (for example, the communication control unit 153) notifies the UE 200 of the quality information by transmitting the reference signal using beams and resources associated with the quality information of the beams. In other words, the eNB 100 implicitly notifies the UE 200 of the BQI by transmitting the beam-formed reference signal using the resources corresponding to the BQI of the beams to be used. Accordingly, the eNB 100 can notify the UE 200 of the BQI without providing a control region in the reference signal and including the BQI in the control region. Further, hereinafter, a beam-formed downlink reference signal is also referred to as a BF DL RS.

Further, the eNB 100 (for example, the setting unit 151) notifies the UE 200 of setting information for causing the UE 200 to acquire the quality information indicating the quality related to the direction of beams. The setting information includes information indicating resources corresponding to the quality information. For example, the setting information includes information indicating resources corresponding to beams with a BQI of 0 and information indicating resources corresponding to beams with a BQI of 0. Accordingly, it is possible for the UE 200 to acquire the BQI which is implicitly notified of. Further, dedicated signaling or system information (for example, a system information block (SIB), master information block (MIB), or the like) may be used for the notification of the setting information. In a case in which the dedicated signaling is used, the UE 200 can acquire the setting information of the eNB 100 after establishing a connection with the eNB 100. On the other hand, in a case in which the system information is used, the UE 200 can acquire the setting information of the eNB 100 before establishing a connection.

Then, the UE 200 (for example, the communication control unit 243) acquires the quality information corresponding to resources used for receiving the reference signal as the quality information of the beams used for transmitting the reference signal on the basis of the setting information in which the quality information of the beams and the resources are associated. For example, the UE 200 acquires the BQI corresponding to resources in which the BF DL RS is received as the BQI of the beams used for transmitting the BF DL RS.

To that end, the UE 200 (for example, the setting unit 241) performs resource setting on the basis of the setting information. For example, the UE 200 performs a setting for associating resources with the BQI on the basis of the setting information. Accordingly, the UE 200 can recognize that the BQI of the BF DL RS received in certain resources is a BQI set in association with the resources.

Here, in the resources used for transmitting the BF DL RS, resources associated with different pieces of quality information are orthogonal to each other. For example, resources corresponding to the beams with the BQI of 0 and resources corresponding to the beams with the BQI of 1 are orthogonal in at least any one of a time domain, a frequency domain, or a code domain. Since the beams corresponding so different BQIs are transmitted using resources orthogonal to each other, the UE 200 can identify the BQI to which each received beam belongs. Further, a plurality of beams for which the same BQI is set may be transmitted using one resource in common or may be transmitted using different resources associated with the same BQI.

An example of such a correspondence between the BQI and the resources will be described with reference to FIGS. 15 to 17.

Figure 15:
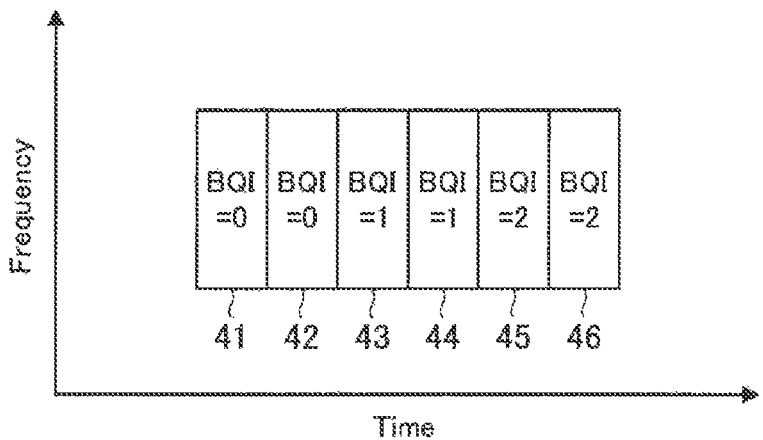
FIG. 15 is a diagram for describing an example of a correspondence relation between a BQI and resources according to the present embodiment.

FIG. 15 is a diagram illustrating an example of a correspondence relation between the BQI and the resources according to the present embodiment. FIG. 15 illustrates an example in which resources associated with different BQIs are orthogonal to each other in the time domain. For example, the BF DL RS beam-formed by the beams with the BQI of 0 is transmitted and received through resources 41 or 42. Further, the BF DL RS beam-formed by the beams with the BQI of 1 is transmitted and received by resources 43 or 44. Further, the BF DL RS beam-formed by the beams with the BQI of 2 is transmitted and received by resources 45 or 46. Further, the resources 41 and 42, the resources 43 and 44, and the resources 45 and 46 are orthogonal to each other in the time domain.

Figure 16:
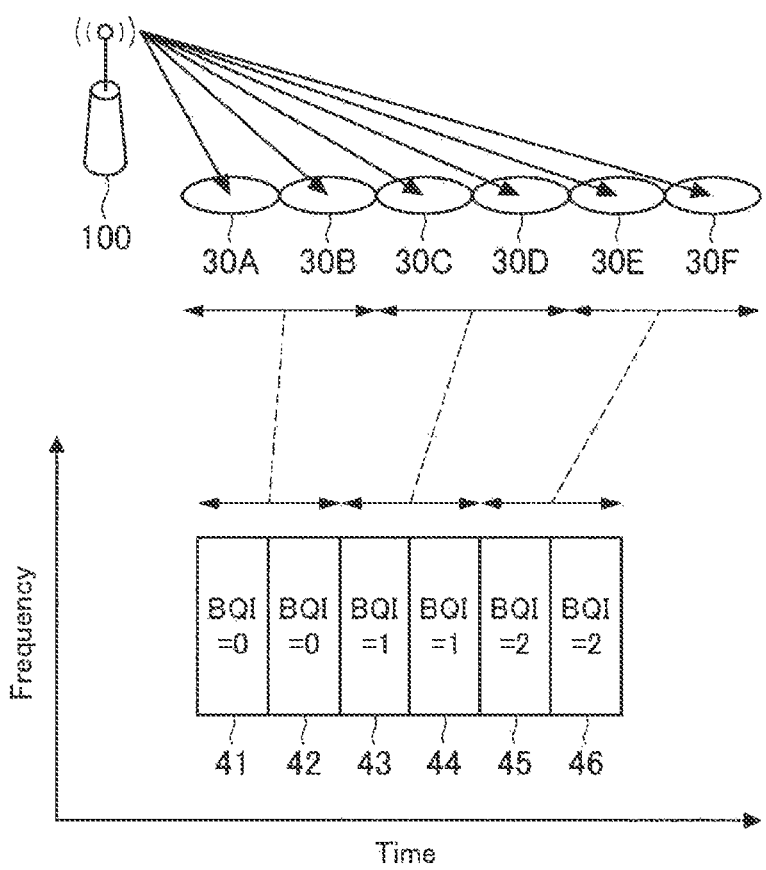
FIG. 16 is a diagram for describing an example of a correspondence relation between a BQI and resources according to the present embodiment.

FIG. 16 is a diagram illustrating an example of a correspondence relation between the BQI and the resources according to the present embodiment. FIG. 16 illustrates a correspondence relation between the resources illustrated in FIG. 15 and the BF DL RS transmitted from the eNB 100. For example, the BF DL RS beam-formed by beams directed toward an area 30A is transmitted and received through the resources 41. Further, the BF DL RS beam-formed by beams directed toward an area 30B is transmitted and received through the resources 42. Further, the BF DL RS beam-formed by beams directed toward an area 30C is transmitted and received through the resources 43. Further, the BF DL RS beam-formed by beams directed toward an area 30D is transmitted and received through the resources 44. Further, the BF DL RS beam-formed by beams directed toward an area 30E is transmitted and received through the resources 45. Further, the BF DL RS beam-formed by beams directed inward an area 30F is transmitted and received through the resources 46. For example, the UE 200 performs measurement to detect resources having high reception power in a state in which it is connected to the eNB 100. Then, in a case in which the reception power in the resources 41 or 42 with the BQI of 0 is high, the UE 200 continues the connection without change. On the other hand, in a case in which the reception power in the resource 45 or 46 with the BQI of 2 is high, the UE 200 may request the handover to the adjacent eNB to the eNB 100 which is the serving eNB. Further, in FIG. 16, one beam corresponds to one resource, but a plurality of beams for which the same BQI is set may correspond to one resource.

Figure 17:
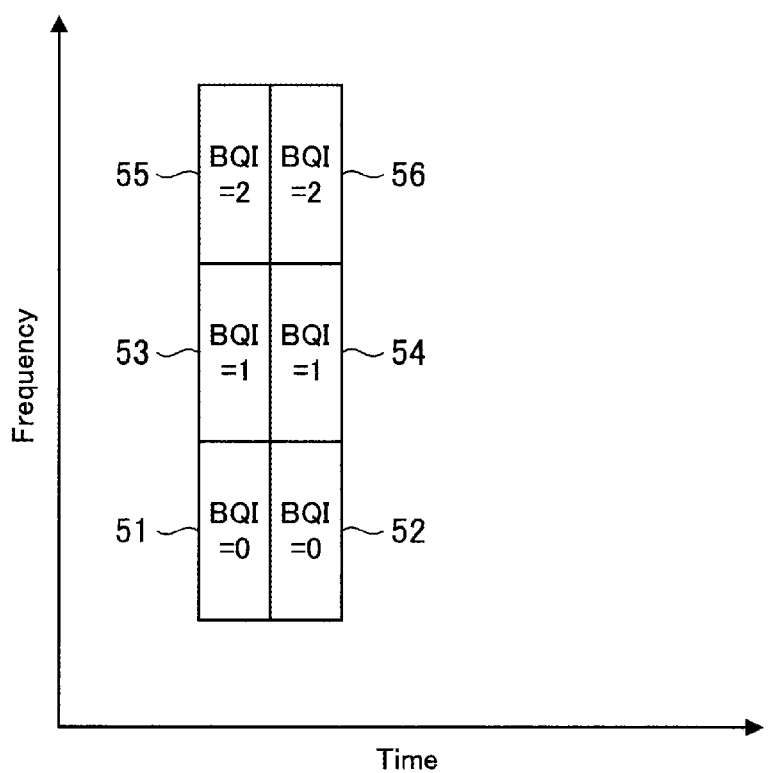
FIG. 17 is a diagram for describing an example of a correspondence relation between a BQI and resources according to the present embodiment.

FIG. 17 is a diagram illustrating an example of a correspondence relation between the BQI and the resources according to the present embodiment. FIG. 17 illustrates an example in which the resources associated with different pieces of quality information are orthogonal to each other in the frequency domain. For example, the BF DL RS beam-formed by the beams with the BQI of 0 is transmitted and received through resources 51 or 52. Further, the BF DL RS beam-formed by the beams with the BQI of 1 is transmitted and received through resources 53 or 54. Further, the BF DL RS beam-formed by the beams with the BQI of 2 is transmitted and received through resources 55 or 56. Further, the resources 51 and 52, the resources 53 and 54, and the resources 55 and 56 are orthogonal to each other in the frequency domain.

The correspondence between the BQI and the resources described above is notified from the eNB 100 to the UE 200 as the setting information. The setting information includes, for example, information indicating beams i use resources k in which the BQI is j. The UE 200 can identify that the BQI of the beams i received in the resources k is j with reference to the setting information.

Further, the correspondence between the BQI and the resources described above may be applied to the data signal in addition to the BF DL RS. In other words, the eNB 100 may implicitly notify the UE 200 of the BQI by transmitting the data signal using beams and resources associated with the BQI of the beams.

(3) Process Based on BQI

For example, the UE 200 (for example, the communication control unit 243) may select an eNB 100 of a connection candidate on the basis of the quality information of the beams. The selection of the connection candidate eNB 100 may mean, for example, the handover in a radio resource control connected (RRC connected) state or cell selection in an RRC idle state. For example, in circumstances in which the eNB 100 causes the sharp beams with the directivity to track the movement of the UE, the UE 200 can perform the handover or the cell selection to a more appropriate eNB 100 in a case in which the BQI is bad even though a good downlink quality is provided. Accordingly, it is possible to suppress interference to the adjacent cell and interference from the adjacent cell.

Evaluation Index

First, a relation between the two evaluation indices such as the reception power and the BQI will be described below. In LTE, for example, the reception power is an evaluation index of the handover or the cell selection. However, in an environment in which the eNB performs communication using beams, it is desirable that the quality information (for example, the BQI) of the beams introduced in the present embodiment be added as the evaluation index as well. The relation between the reception power and the BQI can be arbitrarily set. For example, the UE 200 may select the connection candidate eNB 100 on the basis of the quality information for a plurality of eNBs 100 in which a difference in information indicating the reception power of the reference signal is less than a threshold value. More simply, the UE 200 may give priority to the eNB 100 which is the transmission source of the BF DL RS with the better BQI (that is, may select it as the connection candidate) for a plurality of eNBs 100 in which the reception power of the BF DL RS is within a predetermined range. An example of such an evaluation index is shown in the following Table 2.

TABLE 2

| Reception power of plurality of BF DL RSs of evaluation target | Handling of BQI |
|---|---|
| Reception power < −60 dBm | priority is given to eNB serving as transmission source of BF DL RS with good BQI in this range |
| −60 dBm < reception power <= −80 dBm | priority is given to eNB serving as transmission source of BF DL RS with good BQI in this range |
| −80 dBm < reception power <= −100 dBm | priority is given to eNB serving as transmission source of BF DL RS with good BQI in this range |
| −100 dBm < reception power | priority is given to eNB serving as transmission source of BF DL RS with good BQI in this range |
| others | BQI is not considered. Priority is given to eNB serving as transmission source of BF DL RS with higher reception power |

According to Table 2 above, in a case in which the reception power of the BF DL RS provided by the eNB 100A is −70 dBm, and the reception power of the BF DL RS provided by the eNB 100B is −75 dBm, the reception powers of both signals are included in the same range. In this regard, the UE 200 selects an eNB in which the BQI of the BF DL RS is better out of the eNBs 100A and 100B as the connection candidate. Further, for example, in a case in which the reception power of the BF DL RS provided by the eNB 100A is −70 dBm, and the reception power of the BF DL RS provided by the eNB 100B is −90 dBm, the reception powers of both signals are not included in the same range. In this regard, the UE 200 selects an eNB in which the RSRP is higher out of the eNBs 100A and 100B as the connection candidate.

Measurement Report Trigger

In a case in which the UE 200 is connected to the eNB 100 in the RRC connected state, a measurement report is transmitted so that the eNB 100 makes a handover decision. The measurement report trigger is a condition that triggers a transmission operation of the measurement report. The measurement report trigger is also referred to as a measurement trigger or a measurement event.

In LTE, for example, when a condition such as "RSRP of serving eNB<RSRP of target eNB+ offset" is satisfied, it is employed as the measurement trigger. More simply, when a target eNB expected to be able to provide a better downlink quality than the serving eNB is found, it is employed as the measurement trigger.

In the present embodiment, the measurement trigger in which the BQI is considered is provided. Further, in the following description related to the handover, the serving eNB (that is, the source eNB) is described as an eNB 100A, and the target eNB is described as an eNB 100B.

For example, the UE 200 (for example, the communication control unit 243) transmits a measurement report on the basis of the measurement report trigger related to the quality information of the beams. For example, the UE 200 compares the BQI of the BF DL RS from the serving eNB 100A with the BQI of the BF DL RS from the target eNB 100B, and transmits the measurement report on the basis of a comparison result. Accordingly, although the good downlink quality is provided from the serving eNB 100A, even in a case in which the BQI is bad, and there is a target eNB 100B with the good BQI, the UE 200 can transmit the measurement report and encourage the handover.

An example of the measurement report trigger is shown in the following Table 3.

TABLE 3

| Type of Measurement trigger for handover | Trigger Condition |
|---|---|
| Type 1 | BQI of Serving eNodeB > BQI of target eNodeB |
| Type 2 | In case of \|RSRP of Serving eNodeB-RSRP of Target eNodeB\|<X dB, ⇒ BQI of Serving eNodeB > BQI of Target eNodeB |

A measurement report trigger of type 1 is that there is a connection candidate eNB 100B having better quality information than the connected serving eNB 100A. For example, in a case in which the BQI of the BF DL RS from the target eNB 100B is better than the BQI of the BF DL RS from the serving eNB 100A, the UE 200 transmits the measurement report to the serving eNB 100A. More simply, the UE 200 transmits the measurement report in a case in which there is a target eNB 100B having a better BQI than the serving eNB 100A.

A measurement report trigger of type 2 is that a difference in the information indicating the reception power of the reference signal with the connected eNB 100A is less than a threshold value, and there is a connection candidate eNB 100B having better quality information than the connected eNB 100A. For example, in a case in which the difference between the RSRP of the BF DL RS from the serving eNB 100A and the RSRP of the BF DL RS from the target eNB 100B is less than a threshold value X, and the BQI of the BF DL RS from the target eNB 100A is better than the BQI of the BF DL RS from the serving eNB 100B, the UE 200 transmits the measurement report to the serving eNB 100A. More simply, the UE 200 transmits the measurement report in a case in which there is little difference in the RSRP, and there is a target eNB 100B having a better BQI than the serving eNB 100A.

Measurement Report

The measurement report includes the quality information of the connected eNB 100A and the connection candidate eNB 100B. For example, the measurement report may include the BQI in addition to the RSRP included in LTE. More specifically, the measurement report may include the RSRP and the BQI of the BF DL RS provided from the serving eNB 100A and the RSRP and the BQI of the BF DL RS provided from the target eNB 100B.

Then, the eNB 100 (for example, the communication control unit 153) makes a handover decision regarding the UE 200 on the basis of the measurement report including the quality information of the BF DL RS received by the UE 200. For the decision of whether or not the handover is permitted, for example, a criterion similar to the measurement trigger shown in Table 3 above may be used.

As described above, by including the BQI in the measurement report, the eNB 100 can make the handover decision in consideration of the BQI.

Flow of Process

An example of a flow of a process based on the BQI described above will be described below with reference to FIGS. 18 and 19.

(Handover Process)

Figure 18:
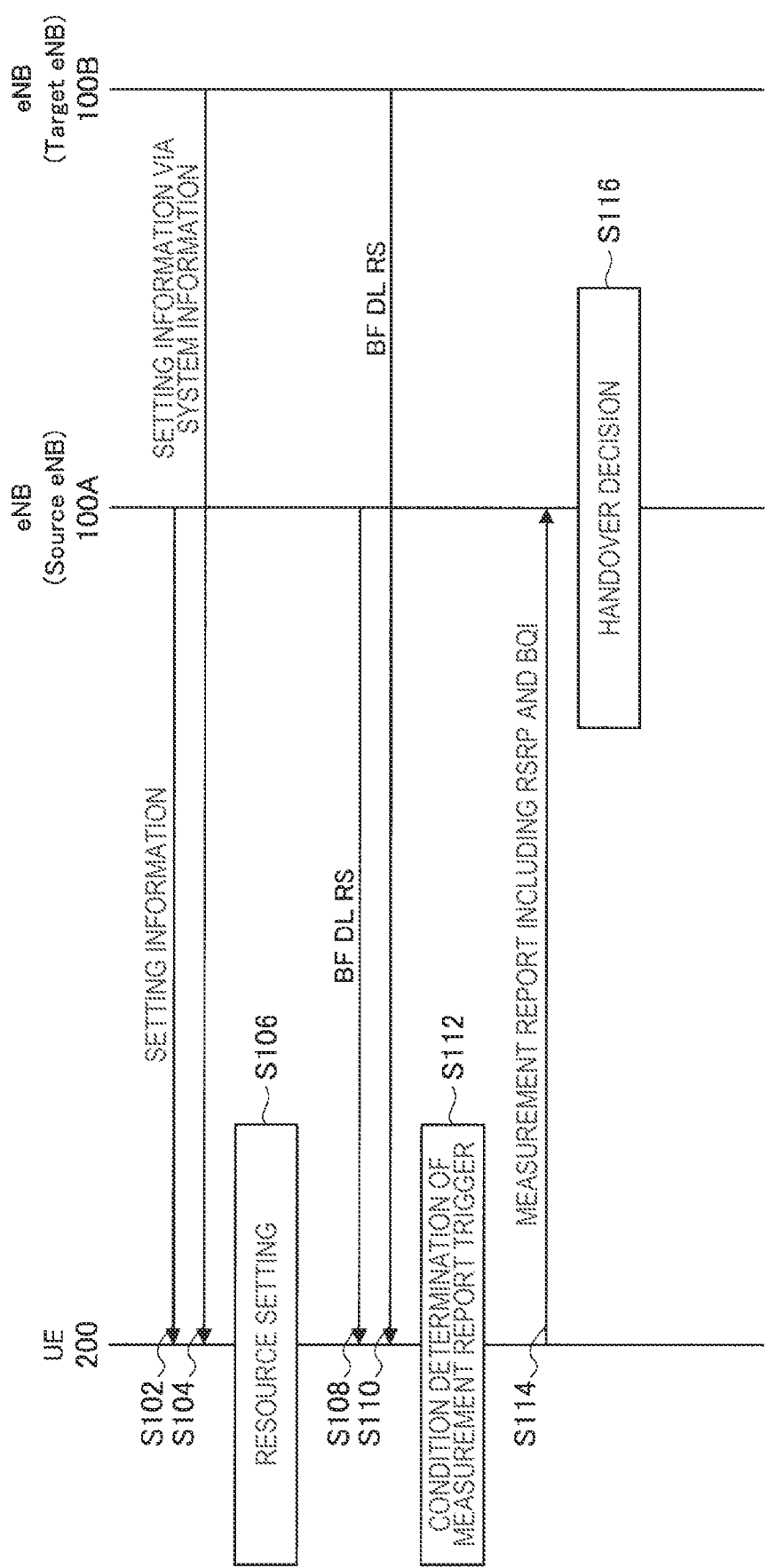
FIG. 18 is a sequence diagram illustrating an example of a flow of a handover process of a UE in an RRC connected state executed in a system according to the present embodiment.

FIG. 18 is a sequence diagram illustrating an example of a flow of a handover process of the UE 200 in the RRC connected state executed in the system 1 according to the present embodiment. In the present sequence, the UE 200, the source eNB 100A, and the target eNB 100B are involved. Further, the UE 200 is assumed to in a state in which it is connected with the eNB 100A.

As illustrated in FIG. 18, first, the UE 200 receives the setting information transmitted from the source eNB 100A using dedicated signaling or the system information (step S102). Further, the UE 200 receives the setting information transmitted from the target eNB 100B using the system information (step S104). The setting information includes, for example, information indicating the correspondence between the quality information of the beams and the resources used for transmitting the BF DL RS beam-formed by the beams.

Then, the UE 200 performs a resource setting on the basis of the received setting information (step S106). For example, the UE 200 performs a setting for associating resources with the BQI on the basis of the setting information.

Then, each of the source eNB 100A and the target eNB 100B transmits the BF DL RS to the UE 200 (steps S108 and S110). At this time, each of the source eNB 100A and the target eNB 100B transmits the BF DL RS by using the resources corresponding to the BQI of the beams used for transmitting the BF DL RS.

Then, the UE 200 performs measurement report trigger condition determination (step S112), and in a case in which the condition is satisfied, the UE 200 transmits the measurement report including the RSRP and the BQI to the serving eNB 100A (step S114). For example, it is assumed that measurement report trigger of type 1 is employed. In this case, the UE 200 transmits the measurement report in a case in which the BQI of the BF DL RS from the target eNB 100B is better than the BQI of the BF DL RS from the source eNB 100A. Further, it is assumed that the measurement report trigger of type 2 is employed. In this case, the UE 200 transmits the measurement report in a case in which there is little difference between the RSFP of the BF DL RS from the source eNB 100A and the RSFP of the BF DL RS from the target eNB 100B, and the latter has a better BQI than the former.

Then, the eNB 100 makes the handover decision on the basis of the received measurement report (step S116).

(Cell Selection Process)

Figure 19:
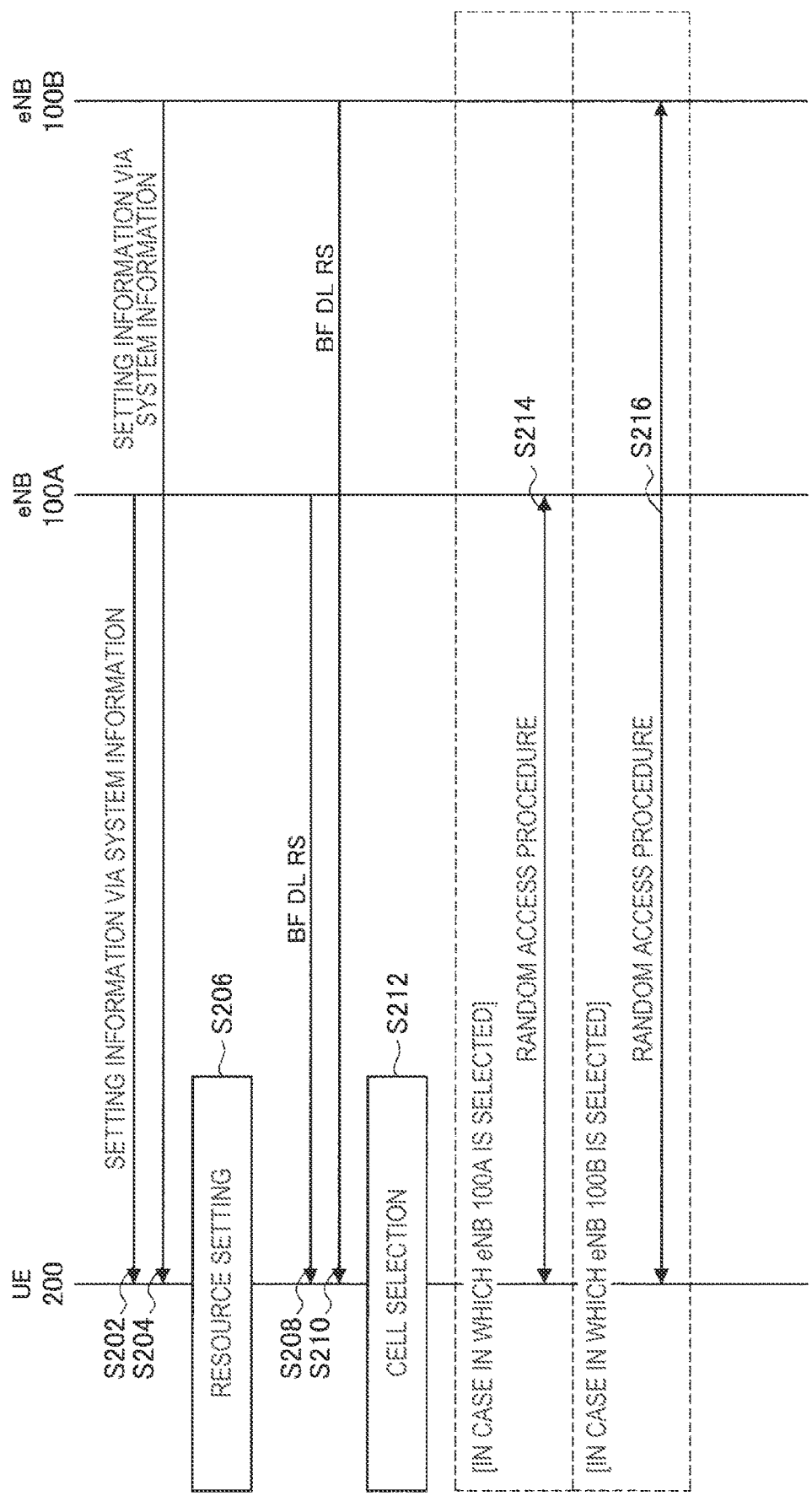
FIG. 19 is a sequence diagram illustrating an example of a flow of a cell selection process of a UE in an RRC idle state executed in a system according to the present embodiment.

FIG. 19 is a sequence diagram illustrating an example of the flow of the cell selection process of the UE 200 in the RRC idle state executed in the system 1 according to the present embodiment. The UE 200, the eNB 100A, and the eNB 100B are invoked in the present sequence.

As illustrated in FIG. 19, the UE 200 first receives the setting information transmitted from the eNB 100A using the system information (step S202). Further, the UE 200 receives the setting information transmitted from the eNB 100B using the system information (step S204). The setting information includes, for example, information indicating the correspondence between the quality information of the beams and the resources used for transmitting the BF DL RS by beam-formed the beams.

Then, the UE 200 performs the resource setting on the basis of the received setting information (step S206). For example, the UE 200 performs a setting for associating resources with BQI on the basis of the setting information.

Then, each of the eNB 100A and the eNB 100B transmits the BF DL RS to the UE 200 (steps S208, S210). At this time, each of the eNB 100A and the eNB 100B transmits the BF DL RS by using each of the resources corresponding to the BQI of the beams used for transmitting the BF DL RS.

Then, the UE 200 performs the cell selection (step S212). For example, the UE 200 selects the connection candidate eNB 100 in accordance with the evaluation index shown in Table 2. For example, in a case in which both the BF DL RS from the eNB 100A and the RSRP of the BF DL RS from the eNB 100B are within a predetermined range, the UE 200 selects an eNB serving as the transmission source of the BF DL RS with the better BQI as the connection candidate. Further, in the other cases, the UE 200 selects the eNB 100 serving as the transmission source of the BF DL RS with the higher RSRP as the connection candidate.

For example, in a case in which the eNB 100A is selected as the connection candidate, the UE 200 performs the random access procedure with the eNB 100A (step S214). On the other hand, in a case in which the eNB 100B is selected as the connection candidate, the UE 200 performs the random access procedure with the eNB 100B (step S216).

5. Second Embodiment

The present embodiment is a mode in which the evaluation index of the BQI is changed in accordance with the size of the eNB 100.

<5.1. Technical Problems>

First, technical problems related to the present embodiment will be described with reference to FIG. 20 and FIG. 21.

Figure 20:
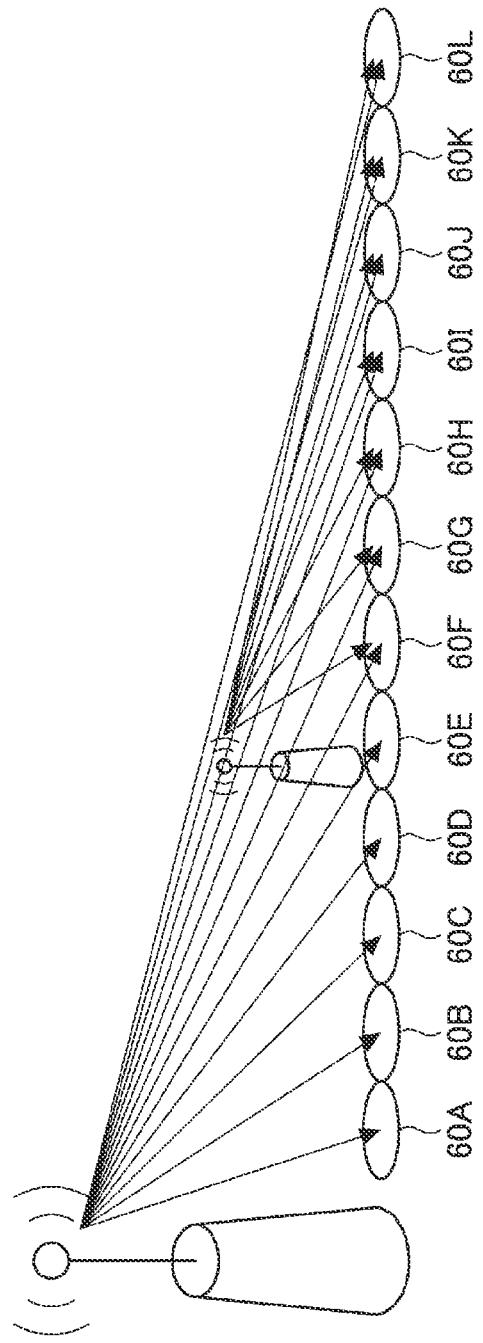
FIG. 20 is a diagram for describing technical problems according to a second embodiment.

FIG. 20 is a diagram for describing technical problems related to the present embodiment. A case in which a small cell eNB is arranged within a cell coverage of a macro cell eNB as illustrated in FIG. 20 is assumed. In the macro cell eNB, an antenna is arranged at a position higher than the small cell eNB, and it tends to transmit a signal with higher power than the small cell eNB. In the example illustrated in FIG. 20, the macro cell eNB provides beams toward a wide range of areas 60A to 60L. Further, the small cell eNB provides beams to a narrow range of areas 60F to 60L.

In LTE, an evaluation index for preventing the UE from selecting the macro cell eNB of high power as the connection candidate even though the small cell eNB is closer in an environment in which the macro cell eNB and the small cell eNB coexist is employed. For example, an evaluation index for comparing the reception power after giving an advantage to the reception power from the small cell eNB is employed. In other words, the UE adds an offset value to the reception power of the reference signal from the small cell, then compares it with the reception power of the reference signal from the macro cell, and selects the connection candidate. Accordingly, a malfunction that the UE selects only the macro cell eNB is prevented.

Here, in the environment in which beams are provided as in the first embodiment, the difference in the transmission power of the reference signal between the macro cell eNB 100A and the small cell eNB 100B is reduced due to the effect of beams. Therefore, when the connection candidate is selected, the macro cell eNB 100A and the small cell eNB 100B are compared on the basis of the BQI in many cases. This point will be described in detail with reference to FIG. 21.

Figure 21:
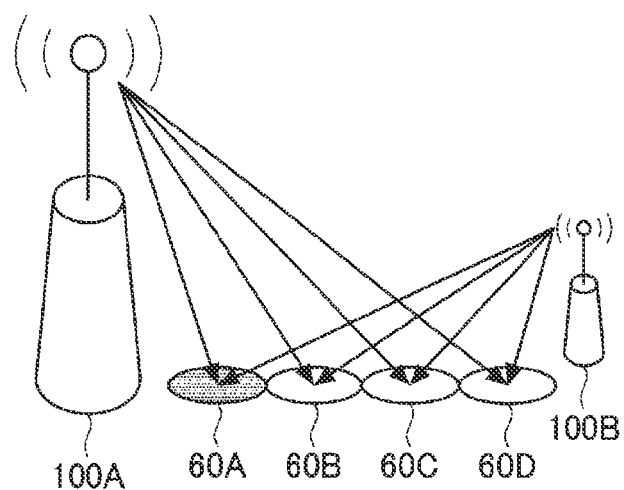
FIG. 21 is a diagram for describing technical problems according to the present embodiment.

FIG. 21 is a diagram for describing technical problems according to the present embodiment. In the example illustrated in FIG. 21, each of a macro cell eNB 100A and a small cell eNB 100B provides beams to areas 60A to 60D. As described in the first embodiment, in a case in which the difference in the reception power of the BF DL RS transmitted from both eNBs is small, the connection candidate is selected on the basis of the BQI. For example, regarding the BF DL RS transmitted using the beams directed toward the area 60A, the BF DL RS from the macro cell eNB 100A is considered to have a better BQI than the BF DL RS from the small cell eNB 100B. This is because, since the area 60A is closer to the macro cell eNB 100A, beams closer to the vertical direction are provided Rom the macro cell eNB 100A. Therefore, the UE 200 selects the macro cell eNB 100A as the connection candidate.

However, if the throughput of the entire system is considered, it is desirable that the UE 200 more easily select the small cell eNB 100B as the connection candidate than the macro cell eNB 100A. This is because when downlink data is distributed and transmitted from a plurality of small cell eNBs 100B, a cell split gain is obtained, and the throughput of the entire system is improved as compared with when downlink data is transmitted from the macro cell eNB 100A. In this regard, in the example illustrated in FIG. 21, it is desirable to provide a mechanism which enables the UE 200 located in the area 60A to select the small cell eNB 100B as the connection candidate.

<5.2. Technical Features>

The UE 200 (for example, the communication control unit 243) may select the connection candidate base station on the basis of the quality information of the beams only among the eNBs 100 having an equal cell size. For example, in a case in which the connection candidate is selected from a plurality of small cell eNBs 100, the UE 200 selects the connection candidate eNB 100 on the basis of the BQI as described above with reference to Table 2 or 3 in the first embodiment.

On the other hand, the UE 200 selects the connection candidate base station among eNB 100 in which the cell sizes are not equal by causing the eNB 100 having the smaller cell size to have an advantage and comparing the reception powers. For example, in a case in which the UE 200 selects the connection candidate out of the small cell eNB 100 and the macro cell eNB 100, the evaluation index in LTE is employed.

With such a mechanism, the UE 200 can select the small cell eNB 100 as the connection candidate even though it is located near the macro cell eNB 100. Further, although the small cell and the macro cell have been described as examples of cells here, a femto cell, a moving cell, or the like can be considered as an example of a cell here. Further, when the cell sizes are equal to each other, it can be understood that the priorities as the connection candidate are equal to each other.

Figure 22:
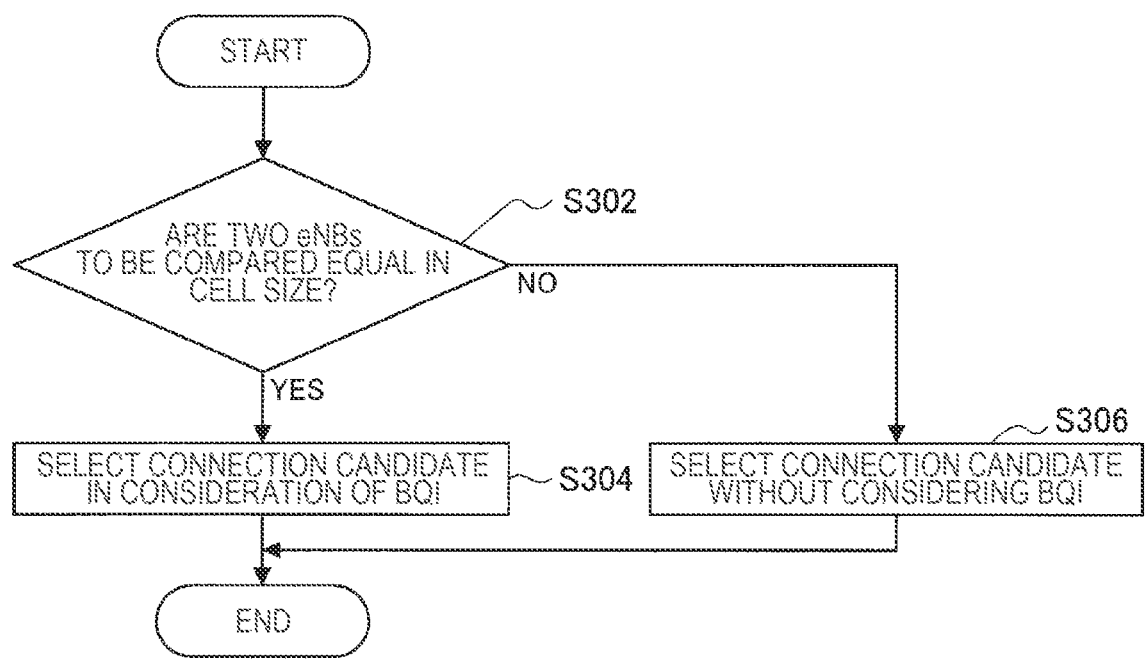
FIG. 22 is a flowchart illustrating an example of a flow of a connection candidate selection process executed in a UE according to the present embodiment.

An example of a flow of a connection candidate selection process by the UE 200 described above will be described below with reference to FIG. 22. FIG. 22 is a flowchart illustrating an example of the flow of the connection candidate selection process executed in the UE 200 according to the present embodiment.

As illustrated in FIG. 22, first, the UE 200 determines whether or not two eNBs 100 to be compared are equal in cell size (step S302). For example, first, the UE 200 identifies whether the eNB 100 serving as the transmission source of the BF DL RS is a macro cell eNB or a small cell eNB on the basis of the code sequence of the received BF DL RS or on the basis of the received system information. Then, the UE 200 compares the sixes of the eNBs 100 serving as the transmission sources of a plurality of received BF DL RSs on the basis of the identification result.

In a case in which it is determined that the sizes are equal (YES in step S302), the UE 200 selects the connection candidate eNB 100 in consideration of the BQI. For example, the UE 200 performs the cell selection using the evaluation index shown in Table 2 or transmits the measurement report on the basis of the measurement report trigger shown in Table 3.

On the other hand, in a case in which it is determined that the sizes are not equal (NO in step S302), the UE 200 selects the connection candidate eNB 100 without considering the BQI. For example, the UE 200 employs the evaluation index in LTE, and selects the connection candidate eNB 100 on the basis of a comparison result of the reception power after causing the eNB 100 having a smaller cell size to have an advantage.

6. Application Examples

The technology according to the present disclosure is applicable to a variety of products. For example, a base station 100 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the base station 100 may be realized as any other types of base stations such as a NodeB and a base transceiver station (BTS). The base station 100 may include a main body (that is also referred to as a base station apparatus) configured to control radio communication, and one or more remote radio heads (RRH) disposed in a different place from the main body. Additionally, various types of terminals to be discussed later may also operate as the base station 100 by temporarily or semi-permanently executing a base station function.

For example, a terminal apparatus 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus.

The terminal apparatus 200 may also be realized as a terminal (that is also referred to as a machine type communication (MTC) terminal) that performs machine-to-machine (M2M) communication. Furthermore, the terminal apparatus 200 may be a radio communication module (such as an integrated circuit module including a single the) mounted on each of the terminals.

<6-1. Application Examples Regarding Base Stations
(First Application Example)

Figure 23:
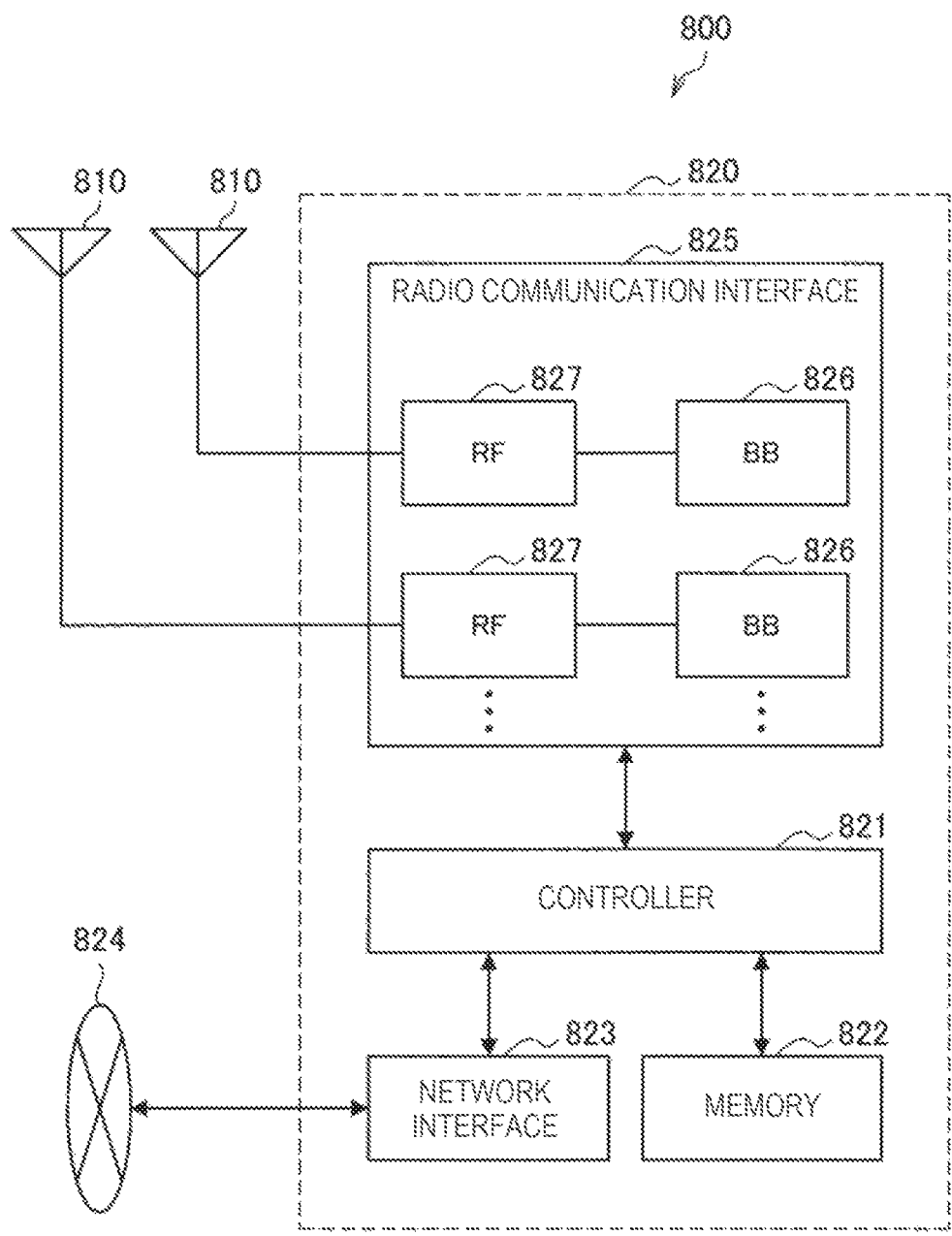
FIG. 23 is a block diagram illustrating a first example of a schematic configuration of an eNB.

FIG. 23 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna, elements (such as multiple antenna elements included in an MIMO antenna), and is used for the base station apparatus 820 to transmit and receive radio signals. The eNB 800 may include the multiple antennas 810, as illustrated in FIG. 23. For example, the multiple antennas 810 may be compatible with multiple frequency bands used by the eNB 800. Although FIG. 23 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 23. For example, the multiple BB processors 826 may be compatible with multiple frequency bands used by the eNB 800. The radio communication interface 825 may include the multiple RF circuits 827, as illustrated in FIG. 23. For example, the multiple RF circuits 827 may be compatible with multiple antenna elements. Although FIG. 23 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 23, one or more components (the setting unit 151 and/or the communication control unit 153) included in the control unit 150 or 250 described with reference to FIG. 9 may be mounted in the radio communication interface 825. Alternatively, at least some of such components may be mounted in the controller 821. As an example, in the eNB 800, a module including a part (for example, the BB processor 826) or all of the radio communication interface 825 and/or the controller 821 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the eNB 800, and the radio communication interface 825 (for example, the BB processor 826) and/or the controller 821 may execute the program. As described above, the eNB 800, the base station apparatus 820 or the module may be provided as an apparatus including the one or more components, and a program causing a processor to function as the one or more components may be provided. In addition, a readable recording medium recording the program may be provided.

In addition, the radio communication unit 120 described with reference to FIG. 9 may be mounted in the radio communication interface 825 (for example, the RF circuit 827) in the eNB 800 shown in FIG. 23. In addition, the antenna unit 110 may be mounted in the antenna 810. In addition, the network communication unit 130 may be mounted in the controller 821 and/or the network interface 823. In addition, the storage unit 140 may be mounted in the memory 822.

(Second Application Example)

Figure 24:
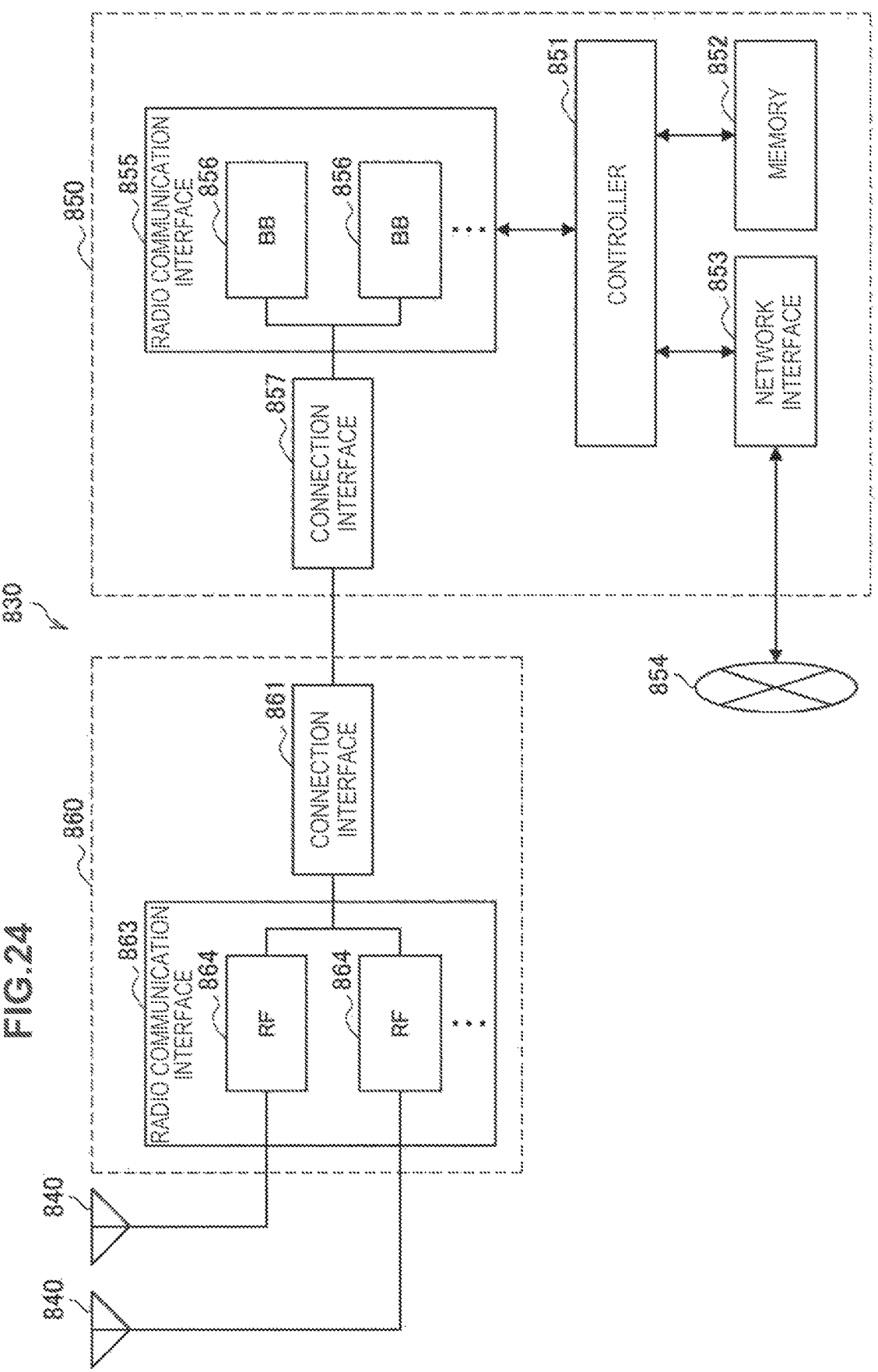
FIG. 24 is a block diagram illustrating a second example of a schematic configuration of an eNB.

FIG. 24 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 24. For example, the multiple antennas 840 may be compatible with multiple frequency bands used by the eNB 830. Although FIG. 24 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 23.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 23, except the BB processor 856 is connected to the RF circuit 864 of the RRH 860 via the connection interface 857. The radio communication interface 855 may include the multiple BB processors 856, as illustrated in FIG. 24. For example, the multiple BB processors 856 may be compatible with multiple frequency bands used by the eNB 830. Although FIG. 24 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 24. For example, the multiple RF circuits 864 may support multiple antenna elements. Although FIG. 24 illustrates the example in which the radio communication interface 863 includes the multiple RF circuits 864, the radio communication interface 863 may also include a single RF circuit 864.

In the eNB 830 shown in FIG. 24, one or more components (the setting unit 151 and/or the communication control unit 153) included in the control unit described with reference to FIG. 9 may be mounted in the radio communication interface 855 and/or the radio communication interface 863. Alternatively, at least some of such components may be mounted in the controller 851. As an example, in the eNB 830, a module including a part (for example, the BB processor 856) or all of the radio communication interface 855 and/or the controller 851 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the eNB 830, and the radio communication interface 855 (for example, the BB processor 856) and/or the controller 851 mas execute the program. As described above, the eNB 830, the base station apparatus 850 or the module may be provided as an apparatus including the one or more components, and a program causing a processor to function as the one or more components may be provided. In addition, a readable recording medium recording the program may be provided.

In addition, for example, the radio communication unit 120 described with reference to FIG. 9 may be mounted in the radio communication interface 863 (for example, the RF circuit 864) in the eNB 830 shown in FIG. 24. In addition, the antenna unit 110 may be mounted in the antenna 840. In addition, the network communication unit 130 may be mounted in the controller 851 and/or the network interface 853. In addition, the storage unit 140 may be mounted in the memory 852.

<6.2. Application Examples Regarding Terminal Apparatus>

(First Application Example)

Figure 25:
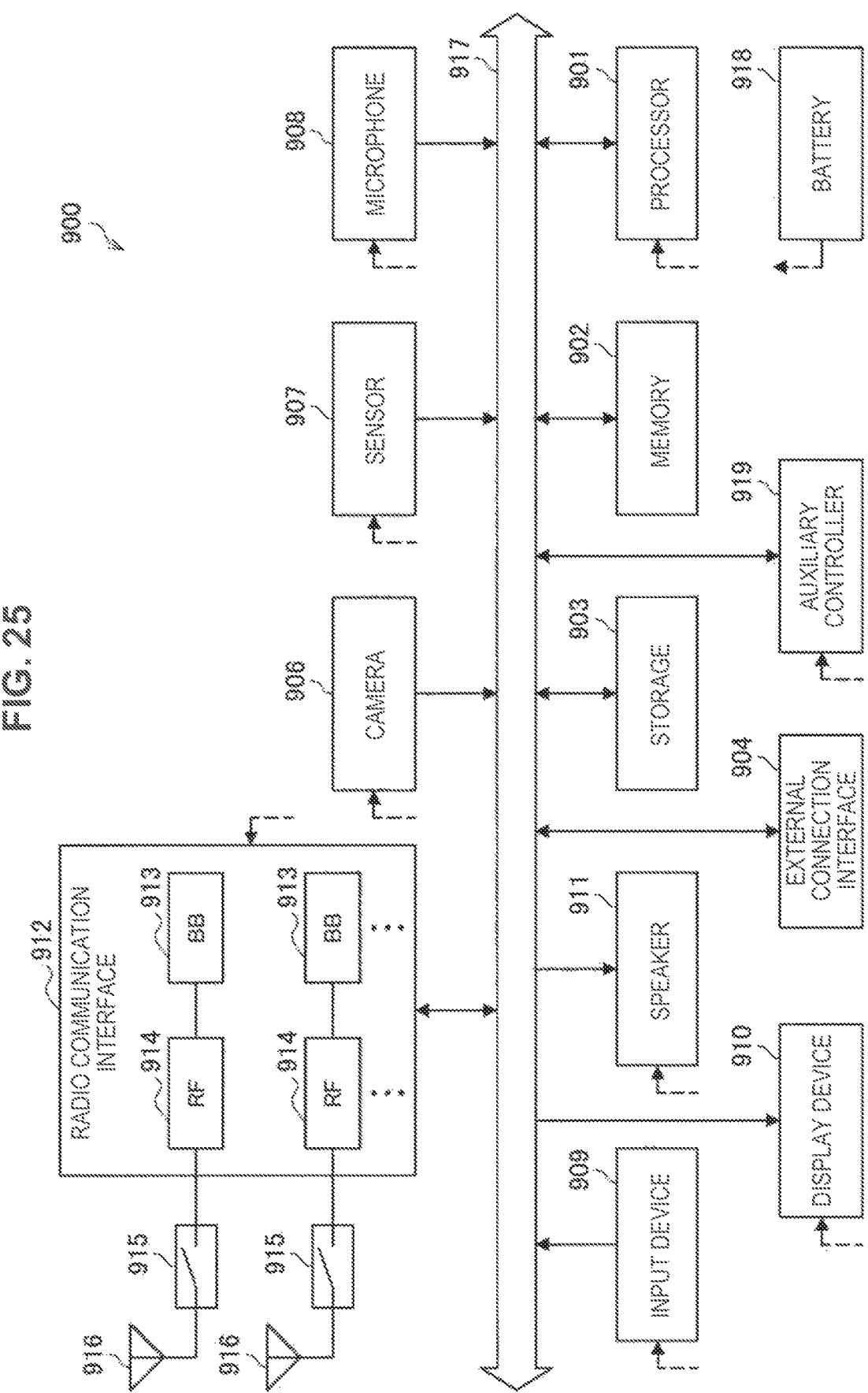
FIG. 25 is a block diagram illustrating an example of a schematic configuration of a smartphone.

FIG. 25 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 25. Although FIG. 25 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 25. Although FIG. 25 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 25 via feeder lines, which are partially shown as dashed lines in the figure. The auxiliary controller 919 operates a minimum necessary function of the smartphone 900, for example, in a sleep mode.

In the smartphone 900 shown in FIG. 25, one or more components (the setting unit 241 and/or the communication control unit 243) included in the control unit 240 described with reference to FIG. 10 may be mounted in the radio communication interface 912. Alternatively, at least some of such components may be mounted in the processor 901 or the auxiliary controller 919. As an example, in the smartphone 900, a module including a part (for example, the BB processor 913) or all of the radio communication interface 912, the processor 901, and/or the auxiliary controller 919 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the smartphone 900, and the radio communication interface 912 (for example, the BB processor 913), the processor 901, and/or the auxiliary controller 919 may execute the program. As described above, the smartphone 900, or the module may be provided as an apparatus including the one or more components, and a program causing a processor to function as the one or more components may be provided. In addition, a readable recording medium recording the program may be provided.

In addition, for example, the radio communication unit 220 described with reference to FIG. 10 may be mounted in the radio communication interface 912 (for example, the RF circuit 914) in the smartphone 900 shown in FIG. 25. In addition, the antenna unit 210 may be mounted in the antenna 916. In addition, the storage unit 230 may be mounted in the memory 902.

(Second Application Example)

Figure 26:
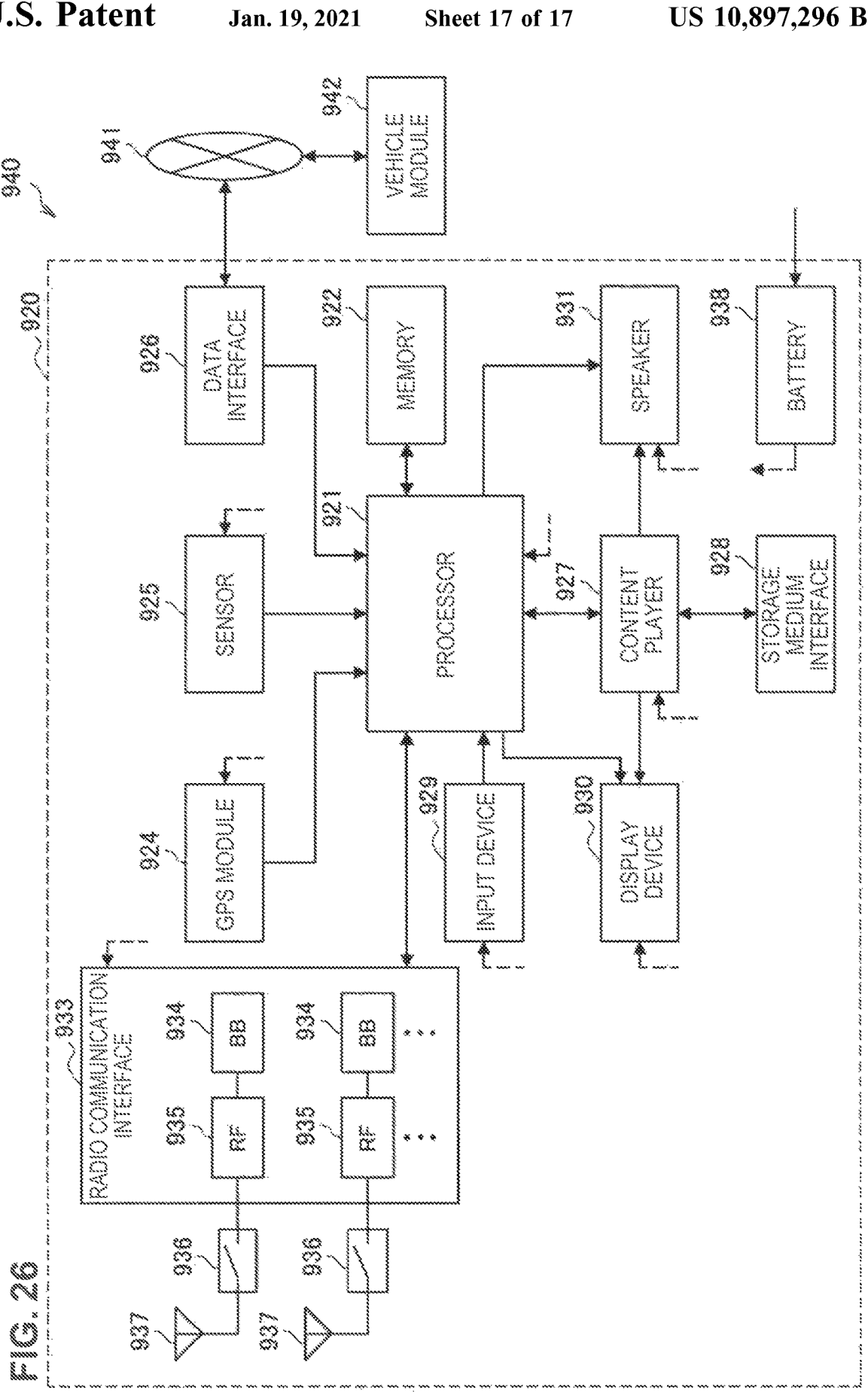
FIG. 26 is a block diagram illustrating an example of a schematic configuration of a car navigation apparatus.

FIG. 26 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as an LCD or an OLED display and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 26. Although FIG. 26 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 26. Although FIG. 26 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 26 via feeder lines that are partially shown as dashed lines in the figure. The battery 938 accumulates power supplied from the vehicle.

In the car navigation apparatus 920 shown in FIG. 26, one or more components (the setting unit 241 and/or the communication control unit 243) included in the control unit 240 described with reference to FIG. 10 may be mounted in the radio communication interface 933. Alternatively, at least some of such components may be mounted in the processor 921. As an example, in the car navigation apparatus 920, a module including a part (for example, the BB processor 934) or all of the radio communication interface 933, and/or the processor 921 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the car navigation apparatus 920, and the radio communication interface 933 (for example, the BB processor 934), and/or the processor 921 may execute the program. As described above, the car navigation apparatus 920, or the module may be provided as an apparatus including the one or more components, and a program causing a processor to function as the one or more components may be provided. In addition, a readable recording medium recording the program may be provided.

In addition, for example, the radio communication unit 220 described with reference to FIG. 10 may be mounted in the radio communication interface 933 (for example, the RF circuit 935) in the car navigation apparatus 920 shown in FIG. 26. In addition, the antenna unit 210 may be mounted in the antenna 937. In addition, the storage unit 230 may be mounted in the memory 922.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

7. CONCLUSION

One embodiment of the present disclosure has been described in detail above with reference to FIGS. 1 to 26. As described above, the UE 200 according to the present embodiment receives the downlink signal transmitted using the beams from the eNB 100 which forms beams and performs communication, and thereby acquires the quality information indicating the quality related to the direction of the beams used for transmitting the downlink signal. For example, the UE 200 acquires the quality information from the control region of the downlink signal or acquires the quality information corresponding to the resources used for receiving the downlink signal as the quality information of the beams used for transmitting the downlink-signal. Accordingly, in the environment in which beam tracking is provided, the UE 200 can evaluate the quality of the beams used for transmitting the downlink signal received from the eNB 100. Therefore, for example, in the circumstances in which the serving eNB 100 causes the sharp beams with directivity to track the movement of the UE, in a case in which the BQI is bad although the good downlink quality is provided, the UE 200 can perform the handover or the cell selection to a more appropriate to the eNB 100. Accordingly, it is possible to suppress interference to the adjacent cell and interference from the adjacent cell.

The preferred embodiment(s) of the present disclosure has/nave been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Note that it is not necessary for the processing described in this specification with reference to the flowchart to be executed in the order shown in the flowchart. Some processing steps may be performed in parallel. Further, some of additional steps can be adopted, or some processing steps can be omitted.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A terminal apparatus, including:

a communication unit configured to perform communication with a base station configured to form beams and perform communication; and a control unit configured to receive a downlink signal transmitted from the base station using the beams and thereby acquire quality information indicating quality related to a direction of the beams used for transmitting the downlink signal.

(2)

The terminal apparatus according to (1), in which the downlink signal is a reference signal.

(3)

The terminal apparatus according to (2), in which the control unit acquires the quality information corresponding to resources used for receiving the reference signal as the quality information of the beams used for transmitting the reference signal on the basis of setting information in which the quality information of the beams is associated with the resources.

(4)

The terminal apparatus according to (2) or (3), in which the control unit selects a connection candidate base station on the basis of the quality information.

(5)

The terminal apparatus according to (4), in which the control unit selects the connection candidate base station on the basis of the quality information for a plurality of base stations in which a difference in information indicating reception power of the reference signal is less than a threshold value.

(6)

The terminal apparatus according to (4), in which the control unit transmits a measurement report on the basis of a measurement report trigger related to the quality information, and the measurement report trigger is that there is a connection candidate base station for which the quality information is better than the quality information of a connected base station.

(7)

The terminal apparatus according to (5), in which the control unit transmits a measurement report on the basis of a measurement report trigger related to the quality information, and the measurement report trigger is that there is a connection candidate base station for which the difference in the information indicating the reception power of the reference signal with the connected base station is less than a threshold value, and the quality information is better than the quality information of the connected base station.

(8)

The terminal apparatus according to (6) or (7), in which the measurement report includes the quality information of the connected base station and the connection candidate base station.

(9)

The terminal apparatus according to any one of (4) to (8), in which the control unit selects the connection candidate base station on the basis of the quality information only among base stations equal in cell size.

(10)

A base station, including:

a communication unit configured to form beams and perform communication with a terminal apparatus; and a control unit configured to notify the terminal apparatus of setting information for causing the terminal apparatus to acquire quality information indicating quality related to a direction of the beams and the quality information.

(11)

The base station according to (10), in which the control unit notifies the terminal apparatus of the quality information by transmitting a reference signal using beams and resources associated with the quality information of the beams.

(12)

The base station according to (11), in which the setting information includes information indicating resources corresponding to the quality information.

(13)

The base station according to (11) or (12), in which, in resources used for transmitting the reference signal, resources associated with different pieces of quality information are orthogonal to each other.

(14)

The base station according to any one of (11) to (13), in which the control unit makes a handover decision related to the terminal apparatus on the basis of a measurement report including the quality information of the reference signal received by the terminal apparatus.

(15)

The base station according to any one of (10) to (14), in which the quality information is set in accordance with an angle formed by a direction of the beams and a reference direction.

(16)

The base station according to any one of (10) to (15), in which the quality information is set in accordance with a degree to which beams face a cell edge.

(17)

A method, including:

performing communication with a base station configured to form beams and perform communication; and receiving, by a processor, a downlink signal transmitted from the base station using the beams and thereby acquiring quality information indicating quality related to a direction of the beams used for transmitting the downlink signal.

(18)

A method, including:

forming beams and performing communication with a terminal apparatus, and notifying, by a processor, the terminal apparatus of setting information for causing the terminal apparatus to acquire quality information indicating quality related to a direction of the beams and the quality information.

(19)

A recording medium having a program recorded thereon, the program causing a computer to function as:

a communication unit configured to perform communication with a base station configured to form beams and perform communication; and a control unit configured to receive a downlink signal transmuted from the base station using the beams and thereby acquire quality information indicating quality related to a direction of the beams used for transmitting the downlink signal.

(20)

A recording medium having a program recorded thereon, the program causing a computer to function as:

a communication unit configured to form beams and perform communication with a terminal apparatus; and a control unit configured to notify the terminal apparatus of setting information for causing the terminal apparatus to acquire quality information indicating quality related to a direction of the beams and the quality information.

REFERENCE SIGNS LIST 1 system
100 base station
110 antenna unit
120 radio communication unit
130 network communication unit
140 storage unit
150 control unit
151 setting unit
153 communication control unit
200 terminal apparatus
210 antenna unit
220 radio communication unit
230 storage unit
240 control unit
241 setting unit
243 communication control unit

The invention claimed is:

1. A terminal apparatus, comprising:
a communications circuitry configured to perform communication with a base station configured to form plural beams and perform communication via at least one of the plural beams; and
a control circuitry configured to receive, from the plural beams of the base station, a corresponding downlink beam reference signal and thereby acquire beam specific quality information set by the base station for each of the plural beams, the beam specific quality information being an index value assigned by the base station for indicating a quality of a direction of a corresponding beam,
wherein the beam specific quality information is set based on an angle between the direction of the corresponding beam and a reference direction, and wherein the beam specific quality information is configured to enable the control circuitry or the base station to determine whether or not to select a connection candidate base station for a handover or a cell selection in an RRC idle state.

2. The terminal apparatus according to claim 1, wherein the control circuitry selects the connection candidate base station on a basis of the beam specific quality information for a plurality of base stations in which a difference in information indicating reception power of the corresponding downlink beam reference signal is less than a threshold value.

3. The terminal apparatus according to claim 1,
wherein the control circuitry transmits a measurement report on a basis of a measurement report trigger related to the beam specific quality information, and
the measurement report trigger is that there are one or more connection candidate base stations for which the beam specific quality information is better than the beam specific quality information of the base station.

4. The terminal apparatus according to claim 3, wherein the measurement report includes the beam specific quality information of the base station and the connection candidate base station.

5. The terminal apparatus according to claim 1,
wherein the control circuitry transmits a measurement report on a basis of a measurement report trigger related to the beam specific quality information, and
the measurement report trigger is that there are one or more connection candidate base stations for which the difference in the information indicating the reception power of the corresponding downlink beam reference signal with the base station is less than a threshold value, and the beam specific quality information is better than the beam specific quality information of the base station.

6. The terminal apparatus according to claim 1, wherein the control circuitry selects the connection candidate base station on a basis of the beam specific quality information only among base stations equal in cell size.

7. The terminal apparatus according to claim 1, wherein, in resources used for transmitting the corresponding downlink beam reference signal, resources associated with different pieces of beam specific quality information are orthogonal to each other.

8. The terminal apparatus according to claim 1, wherein the index value indicates one of the following:
angle close to vertical direction (~−90°);
intermediate angle between vertical direction and horizontal direction;
angle close to vertical direction (~0°);
angle close to zenith direction (~90°);
intermediate angle between zenith direction and horizontal direction; or
angle close to horizontal direction (~0°).

9. The terminal apparatus according to claim 1, wherein the control circuitry performs the handover or the cell selection with the connection candidate base station based the beam specific quality information.

10. A base station, comprising:
communications circuitry configured to form plural beams and perform communication with a terminal apparatus via at least one of the plural beams; and
control circuitry configured to transmit a corresponding downlink beam reference signal to the terminal apparatus using the plural beams, thereby causing the terminal apparatus to acquire beam specific quality information set by the base station, the beam specific quality information being an index value assigned by the base station for indicating a quality of a direction of a corresponding beam,
wherein the beam specific quality information is set based on an angle between the direction of the corresponding beam and a reference direction, and
wherein the beam specific quality information is configured to enable the control circuitry or the terminal apparatus to determine whether or not select a connection candidate base station for handover or cell selection in an RRC idle state.

11. The base station according to claim 10, wherein, in resources used for transmitting the corresponding downlink beam reference signal, resources associated with different pieces of beam specific quality information are orthogonal to each other.

12. The base station according to claim 10, wherein the control circuitry makes a corresponding handover decision or cell selection decision related to the terminal apparatus on a basis of a measurement report including the beam specific quality information of the corresponding downlink beam reference signal received by the terminal apparatus.

13. The base station according to claim 10, wherein the beam specific quality information is set in accordance with a degree to which beams face a cell edge.

14. The base station according to claim 10, wherein the index value indicates one of the following:
- angle close to vertical direction (~−90°);
- intermediate angle between vertical direction and horizontal direction;
- angle close to vertical direction (~0°);
- angle close to zenith direction (~90°);
- intermediate angle between zenith direction and horizontal direction; or
- angle close to horizontal direction (~0°).

15. The base station according to claim 10, wherein the control circuitry performs the handover or the cell selection with the connection candidate base station based the beam specific quality information.

16. A method performed by a terminal apparatus including communications circuitry and control circuitry, the method comprising:
- performing communication with a base station configured to form plural beams and perform communication via at least one of the plural beams;
- receiving, from the plural beams of the base station, a corresponding downlink beam reference signal and thereby acquire beam specific quality information set by the base station for each of the plural beams, the beam specific quality information being an index value assigned by the base station for indicating a quality of a direction of a corresponding beam,
- wherein the beam specific quality information is set based on an angle between the direction of the corresponding beam and a reference direction; and
- wherein the beam specific quality information is configured to enable the control circuitry or the base station to determine whether or not select a connection candidate base station for handover or cell selection in an RRC idle state.

17. A non-transitory recording medium having a program recorded thereon, the program causing a device to perform the method of claim 16.

18. The method according to claim 16, further comprising:
- performing the handover or the cell selection with the connection candidate base station based the beam specific quality information.

19. A method performed by a base station including communications circuitry and control circuitry, the method comprising:
- forming plural beams and performing communication with a terminal apparatus via at least one of the plural beams; and
- transmitting a corresponding downlink beam reference signal to the terminal apparatus using the plural beams, thereby causing the terminal apparatus to acquire beam specific quality information set by the base station, the beam specific quality information being an index value assigned by the base station for indicating quality of a direction of a corresponding beam,
- wherein the beam specific quality information is set based on an angle between the direction of the corresponding beam and a reference direction, and
- wherein the beam specific quality information is configured to enable the control circuitry or the terminal apparatus to determine whether or not select a connection candidate base station for handover or cell selection in an RRC idle state.

20. A non-transitory recording medium having a program recorded thereon, the program causing a device to perform the method of claim 19.

21. The method according to claim 19, further comprising:
- performing the handover or the cell selection with the connection candidate base station based the beam specific quality information.

* * * * *